United States Patent
Kitamura et al.

(10) Patent No.: US 12,025,989 B2
(45) Date of Patent: Jul. 2, 2024

(54) TRAVELING VEHICLE SYSTEM AND TRAVELING VEHICLE CONTROL METHOD

(71) Applicant: Murata Machinery, Ltd., Kyoto (JP)

(72) Inventors: Wataru Kitamura, Inuyama (JP); Eijiro Aoki, Inuyama (JP); Toshikazu Nakagawa, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 308 days.

(21) Appl. No.: 17/612,284

(22) PCT Filed: Mar. 17, 2020

(86) PCT No.: PCT/JP2020/011697
§ 371 (c)(1),
(2) Date: Nov. 18, 2021

(87) PCT Pub. No.: WO2020/235196
PCT Pub. Date: Nov. 26, 2020

(65) Prior Publication Data
US 2022/0317703 A1 Oct. 6, 2022

(30) Foreign Application Priority Data

May 22, 2019 (JP) ................................ 2019-095828

(51) Int. Cl.
*G05D 1/00* (2024.01)
*B61B 3/02* (2006.01)
(Continued)

(52) U.S. Cl.
CPC ............. *G05D 1/0291* (2013.01); *B61B 3/02* (2013.01); *B65G 1/0464* (2013.01); *B65G 1/1373* (2013.01)

(58) Field of Classification Search
CPC .......... G05D 1/0291; G05D 2201/0216; B61B 3/02; B65G 1/0464; B65G 1/1373
See application file for complete search history.

(56) References Cited

U.S. PATENT DOCUMENTS

2010/0256852 A1* 10/2010 Mudalige ............... G08G 1/164
701/24
2011/0224892 A1* 9/2011 Speiser .................... G08G 1/01
701/118
(Continued)

FOREIGN PATENT DOCUMENTS

JP 63-163608 7/1988
JP 05-094211 4/1993
(Continued)

*Primary Examiner* — Behrang Badii
*Assistant Examiner* — Jay Khandpur
(74) *Attorney, Agent, or Firm* — DLA Piper LLP (US)

(57) ABSTRACT

A traveling vehicle system includes a plurality of traveling vehicles, a controller that controls the plurality of transport vehicles, a traveling region of the traveling vehicles having a plurality of blocking sections each of which undergoes exclusive control to prohibit another traveling vehicle from moving thereinto. The traveling vehicle makes a request to the controller for occupation permissions regarding a plurality of blocking sections to be occupied by the traveling vehicle and are designated by instructions. The controller then determines, among the plurality of blocking sections for which the traveling vehicle makes a request for occupation permissions, one or more of the blocking sections that are able to allow permissions consecutively from an end thereof to be primarily occupied, based on the traveling direction of the traveling vehicle, and the controller grants the traveling vehicle the permissions for one or more blocking sections determined to allow the permissions.

7 Claims, 17 Drawing Sheets

(51) Int. Cl.
    *B65G 1/04*     (2006.01)
    *B65G 1/137*    (2006.01)

(56)            References Cited

U.S. PATENT DOCUMENTS

| | | | |
|---|---|---|---|
| 2013/0090801 | A1 | 4/2013 | Backes et al. |
| 2013/0325223 | A1* | 12/2013 | Sengupta ................ B61L 27/16 |
| | | | 701/19 |
| 2016/0202698 | A1* | 7/2016 | Yamasaki ............. B61L 25/025 |
| | | | 701/2 |
| 2018/0259976 | A1* | 9/2018 | Williams ........... G01C 21/3664 |
| 2020/0080853 | A1* | 3/2020 | Tam ..................... G05D 1/0276 |
| 2021/0155407 | A1* | 5/2021 | Austrheim .............. B66F 9/063 |

FOREIGN PATENT DOCUMENTS

| | | |
|---|---|---|
| JP | 11-143535 | 5/1999 |
| JP | 2001-100842 | 4/2001 |
| JP | 2005-239314 | 9/2005 |
| JP | 2010-160696 | 7/2010 |
| JP | 2015-225541 | 12/2015 |
| JP | 6267059 | 1/2018 |

\* cited by examiner

FIG. 10

| # | Traveling vehicle information D1 | Request | | | | Response | | | |
|---|---|---|---|---|---|---|---|---|---|
| | | Requested section D2 | Request type D3 | Operation D4 | Generated time D5 | Section D6 | Response type D7 | Operation D8 | Time D9 |
| 1 | ○○ | ○○ | ○○ | ○○ | ○○ | ○○ | ○○ | ○○ | ○○ |
| 2 | ○○ | ○○ | ○○ | ○○ | ○○ | ○○ | ○○ | ○○ | ○○ |
| 3 | ○○ | ○○ | ○○ | ○○ | ○○ | ○○ | ○○ | ○○ | ○○ |

T4

TRAVELING VEHICLE SYSTEM AND TRAVELING VEHICLE CONTROL METHOD

TECHNICAL FIELD

This disclosure relates to a traveling vehicle system, and a traveling vehicle control method.

BACKGROUND

In manufacturing factories such as semiconductor manufacturing factories, a traveling vehicle system is used to transport articles such as transportation containers (FOUPs, reticle pods) for containing semiconductor wafers or reticles. A traveling vehicle system that includes a plurality of traveling vehicles traveling on a track and a controller that controls the plurality of traveling vehicles is known as such a traveling vehicle system. Each of the plurality of traveling vehicles transmits information such as its current location to the controller by wireless communication or the like. The controller determines a traveling vehicle to handle transportation of an article on the basis of the location of the traveling vehicle and so forth, and transmits a transport instruction to the traveling vehicle.

The track used in the above traveling vehicle system typically has a plurality of intersections. For each intersection, a blocking section is designated which undergoes, when occupied by one of a plurality of traveling vehicles, exclusive control to prohibit another traveling vehicle from moving thereinto. The traveling vehicle is allowed to occupy and pass through the blocking section when an occupation permission for the blocking section is granted by the controller. The traveling vehicle is controlled to not move into the blocking section when the occupation permission is not granted by the controller.

As the exclusive control mentioned above, there is known a configuration in which, by checking the traveling route of a traveling vehicle, a controller grants the traveling vehicle occupation permission for only sections that are permissible among a plurality of blocking sections through which the traveling vehicle is to pass (for example, Japanese Unexamined Patent Application, First Publication No. S63-163608). Also, as the exclusive control mentioned above, there is known a configuration in which a traveling vehicle requests the controller for occupation permissions for blocking sections, and the controller grants the traveling vehicle the occupation permissions in response to the occupation permission request.

In the configuration of Japanese Unexamined Patent Application, First Publication No. S63-163608, a traveling vehicle is unnecessarily permitted to also occupy the blocking sections ahead, through which the traveling vehicle will not be passing immediately. In such an arrangement, even during a period in which the traveling vehicle permitted to occupy the blocking sections is not in fact passing through the blocking sections, another traveling vehicle is unable to pass through the blocking sections during the period, hindering the traveling of this another traveling vehicle in some cases. In the configuration such that a traveling vehicle requests a controller for occupation permissions for blocking sections, and the controller grants the traveling vehicle the occupation permissions, while the hindrance to the traveling of the traveling vehicle mentioned above is suppressed, the number of communication sessions performed between the controller and the traveling vehicle increases, thus imposing a load on the controller.

It could therefore be helpful to provide, in a traveling vehicle system that prevents interference between traveling vehicles by exclusive control, a means to avoid hindrance to traveling of the traveling vehicles associated with the exclusive control as much as possible while suppressing the number of communication sessions performed between the controller and the traveling vehicles.

SUMMARY

We thus provide:

A traveling vehicle system comprising: a plurality of traveling vehicles, and a controller that is capable of communicating with the plurality of traveling vehicles and that controls the plurality of traveling vehicles, a traveling region of the traveling vehicles having designated therein a plurality of blocking sections which undergoes, when occupied by one of the plurality of traveling vehicles, exclusive control to prohibit another traveling vehicle from moving thereinto, and the traveling vehicle being controlled so as to be able to occupy and pass through the blocking sections when occupation permissions for the blocking sections are granted by the controller and so as to be prohibited to move into the blocking sections when the occupation permissions are not granted by the controller, wherein the traveling vehicle makes a request to the controller, collectively as one set of information through one communication session, for occupation permissions regarding a plurality of the blocking sections that are to be occupied by the traveling vehicle and are designated by instructions, and wherein the controller determines, in accordance with a predetermined criterion that is set in advance, among the plurality of blocking sections for which the traveling vehicle makes a request for occupation permissions, one or more of the blocking sections that are able to allow permissions consecutive from an end thereof to be primarily occupied, based on the traveling direction of the traveling vehicle, and the controller grants the traveling vehicle the occupation permissions for the one or more blocking sections that are determined to be able to allow the permissions.

The plurality of blocking sections for which the traveling vehicle requests the controller for the occupation permissions may be a part of all blocking sections that are to be occupied by the traveling vehicle and are designated by the instructions. The number of the plurality of blocking sections for which the traveling vehicle requests the controller for the occupation permissions may be determined on the basis of one or both of a speed of the traveling vehicle and a cycle of communication performed between the traveling vehicle and the controller. After the traveling vehicle completes an operation in the blocking sections, the controller may release the occupation in the blocking sections. The predetermined criterion may include granting occupation permissions for the blocking sections to the traveling vehicle that requested the occupation permissions first, when requests for occupation permissions for the blocking sections are received from the plurality of traveling vehicles. The predetermined criterion may include granting occupation permissions for the blocking sections to the traveling vehicle of a high priority among the plurality of traveling vehicles, on the basis of the priorities of the plurality of traveling vehicles, when occupation permissions for the blocking sections are requested from the plurality of traveling vehicles. The traveling vehicle system may comprise a grid-patterned track that has a plurality of first tracks extending along a first direction, and a plurality of second tracks extending along a second direction, which is different from the first direction, and that forms a plurality of cells with the plurality of first tracks and the plurality of second tracks, wherein the plurality of traveling vehicles travel on the first tracks or the second tracks along the grid-patterned track, and the blocking section is set for each grid cell, which is one of the cells in the grid-patterned track. The plurality of blocking sections for which the traveling vehicle requests the controller for the occupation permissions may be the plurality of grid cells that are consecutive along one of the first direction and the second direction.

A traveling vehicle control method in a traveling vehicle system includes a plurality of traveling vehicles and a controller that is capable of communicating with the plurality of traveling vehicles and that controls the plurality of traveling vehicles, a traveling region of the traveling vehicles having designated therein a plurality of blocking sections each of which undergoes, when occupied by one of the plurality of traveling vehicles, exclusive control to prohibit another traveling vehicle from moving thereinto, and the traveling vehicle being controlled to be able to occupy and pass through the blocking sections when occupation permissions for the blocking sections are granted by the controller and to be prohibited to move into the blocking sections when the occupation permissions are not granted by the controller, the method comprising: making the travelling vehicle to make a request to the controller, collectively as one set of information through one communication session, for occupation permissions regarding a plurality of the blocking sections that are to be occupied by the traveling vehicle and are designated by instructions; and making the controller to determine, in accordance with a predetermined criterion that is set in advance, among the plurality of blocking sections for which the traveling vehicle makes a request for occupation permissions, one or more of the blocking sections that are able to allow permissions from an end thereof to be primarily occupied, based on the traveling direction of the traveling vehicle, and to grant the traveling vehicle the occupation permissions for the one or more blocking sections that are determined to be able to allow the permissions.

According to the traveling vehicle system and the traveling vehicle control method, in the traveling vehicle system that prevents interference between traveling vehicles by exclusive control, the number of times of communication between the controller and the traveling vehicles can be reduced in comparison to a configuration that requires transmission of an occupation permission request individually for each blocking section, and also an occupation permission for an appropriate blocking section can be promptly granted to a traveling vehicle in comparison to a configuration in which no occupation permission will be granted unless the controller can permit all sections of a requested plurality of blocking sections. Therefore, it is possible to avoid hindrance to the traveling of traveling vehicles associated with exclusive control.

In a configuration such that the plurality of blocking sections for which the traveling vehicle requests the controller for the occupation permissions are a part of all blocking sections that are to be occupied by the traveling vehicle and are designated by the instructions, the blocking sections occupied by a traveling vehicle at a time can be shortened in comparison to a configuration in which occupation permissions are requested for all sections to be occupied by a traveling vehicle. In a configuration such that the number of the plurality of blocking sections for which the traveling vehicle requests the controller for the occupation permissions is determined on the basis of one or both of a speed of the traveling vehicle and a cycle of communication performed between the traveling vehicle and the controller, it is possible to suppress to grant a traveling vehicle occupation permissions for blocking sections arranged at positions where the traveling vehicle cannot be traveling when the speed or the communication cycle of the traveling vehicle is taken into consideration. In a configuration such that after the traveling vehicle completes an operation in the blocking sections, the controller releases the occupation in the blocking sections, hindrance to the traveling of a traveling vehicle associated with exclusive control can be avoided to the maximum extent possible, since the occupation permission is released for each blocking section, for blocking sections where the operation of a traveling vehicle such as passing is completed.

In a configuration such that the predetermined criterion includes granting occupation permissions for the blocking sections to the traveling vehicle that requested the occupation permissions first, when requests for occupation permissions for the blocking sections are received from the plurality of traveling vehicles, it is possible to prevent the traveling of a traveling vehicle that requests an occupation permission first from being hindered by a traveling vehicle that requests an occupation permission later. In a configuration such that the predetermined criterion includes granting occupation permissions for the blocking sections to the traveling vehicle of a high priority among the plurality of traveling vehicles, on the basis of the priorities of the plurality of traveling vehicles, when occupation permissions for the blocking sections are requested from the plurality of traveling vehicles, it is possible to prevent the traveling of a traveling vehicle of a high priority from being hindered by a traveling vehicle of a low priority.

In a configuration that includes a grid-patterned track that has a plurality of first tracks extending along a first direction, and a plurality of second tracks extending along a second direction, which is different from the first direction, and that forms a plurality of cells with the plurality of first tracks and the plurality of second tracks, wherein the plurality of traveling vehicles travel on the first tracks or the second tracks along the grid-patterned track, and the blocking section is set for each grid cell, which is one of the cells in the grid-patterned track, a traveling vehicle in a stop state at any grid cell hinders the traveling of another traveling vehicle since all of the grid cells of a grid-patterned track are intersections. Therefore, in a grid-patterned track, hindrance to the traveling of another traveling vehicle is likely to reduce the traveling efficiency in comparison to a traveling vehicle system configuration having tracks other than a grid-patterned track. According to the above configuration, however, it is possible to suppress the reduction in the traveling efficiency mentioned above. In a configuration such that the plurality of blocking sections for which the traveling vehicle requests the controller for the occupation permissions are the plurality of grid cells that are consecutive along one of the first direction and the second direction, occupation permissions are not granted to a traveling vehicle for the blocking sections in which the traveling vehicle is to travel after changing the direction thereof, and therefore, it is possible to suppress hindrance to the traveling of a traveling vehicle associated with exclusive control in the blocking sections including the traveling route after changing the direction of the traveling vehicle, in comparison to a configuration in which occupation permissions are granted for the blocking sections including the traveling route of the traveling vehicle before and after changing the direction thereof.

BRIEF DESCRIPTION OF THE DRAWINGS

FIG. 10 is a diagram showing an example of request management information.

DESCRIPTION OF REFERENCE SIGNS

Figure 1:
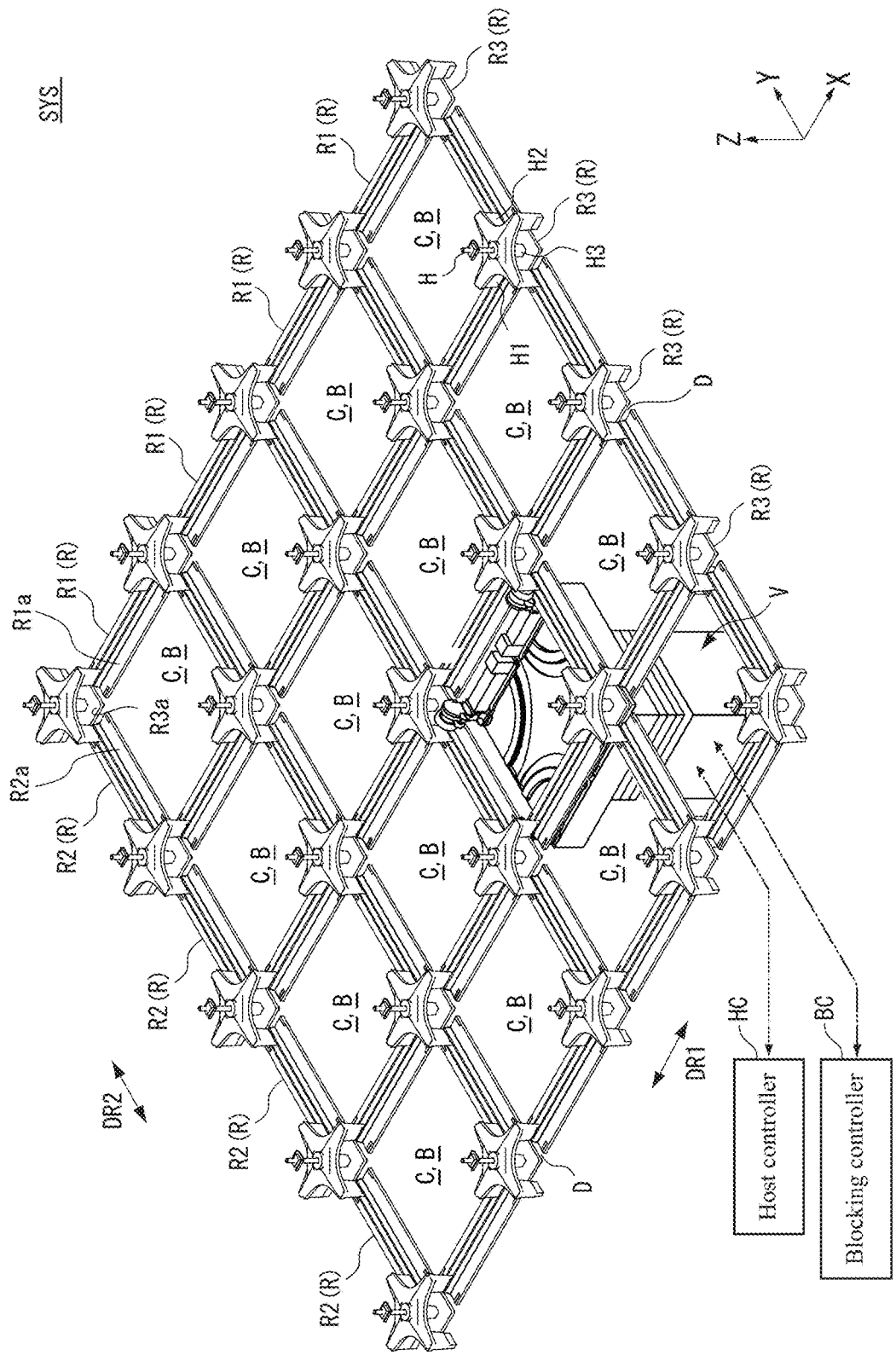
FIG. 1 is a perspective view showing a first example of a traveling vehicle system.

SYS, SYS2: Traveling vehicle system
R: Grid-patterned track (track)
RA: Track
B, B1-B60, BA: Blocking section
C: C1-C60 grid cell (cell)
M: Article
V, VA, V1-Vn: Traveling vehicle
BC: Blocking controller
HC: Host controller
10: Main body
20: Traveler
30: Coupler
50: Controller
51: Memory storage
55: Occupation requester
56: Release requester
61: Memory storage
63: Occupation request processor
64: Occupation request determiner
65: Release request processor
66: Release request determiner
67: Responder
DR1: First direction
DR2: Second direction
Ma: Flange
R1: First track
R2: Second track
R3: Intersection
T1: Occupation permission information
T2: Map information
T3: Instruction information
T4: Request management information
T5: Occupation management information
T6: Response information
CM1: Transport instruction
RQ1: Occupation request
RQ2: Release request

DETAILED DESCRIPTION

The following describes examples with reference to the drawings. However, this disclosure is not limited to the examples. In the drawings, scale is changed as necessary to illustrate the examples such as by enlarging or emphasizing a portion. In the following drawings, an XYZ coordinate system is used to describe the directions in each drawing. In the XYZ coordinate system, a plane that is parallel to a horizontal plane is defined as an XY plane. A direction along this XY plane is denoted as X direction, and a direction orthogonal to the X direction is denoted as Y direction. The traveling direction of the traveling vehicle V can change from the state shown in the following figures to another direction, and may also travel along, for example, a curved direction in some cases. A direction perpendicular to the XY plane is denoted as a Z direction. For each of the X direction, the Y direction, and the Z direction, description is made with a definition in which a direction indicated by an arrow is the positive (+) direction and a direction opposite to the direction indicated by the arrow is the negative (−) direction. Moreover, the turning direction around the vertical axis or the Z axis is referred to as θZ direction.

First Example

Figure 2:
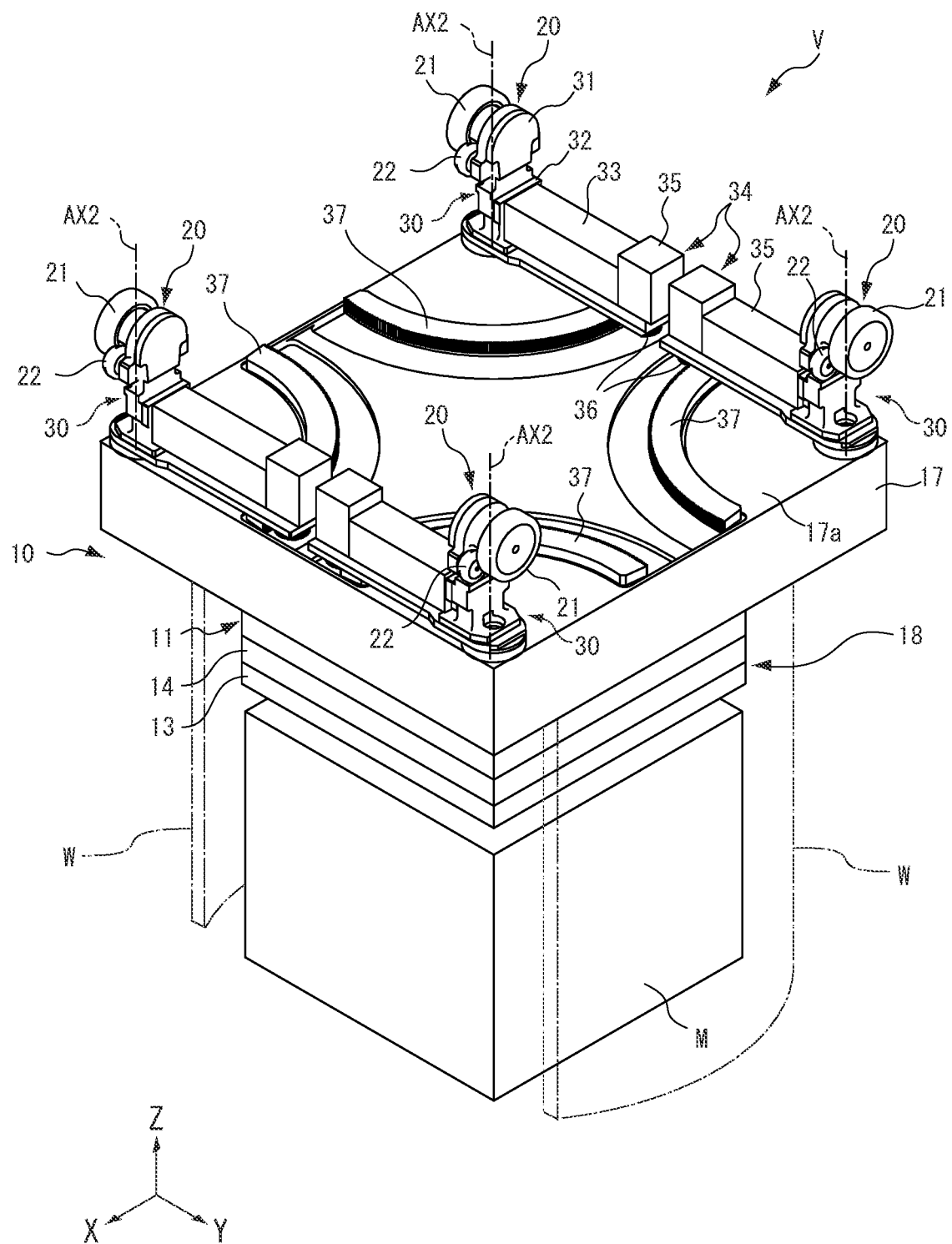
FIG. 2 is a perspective view showing an example of a traveling vehicle.
Figure 3:
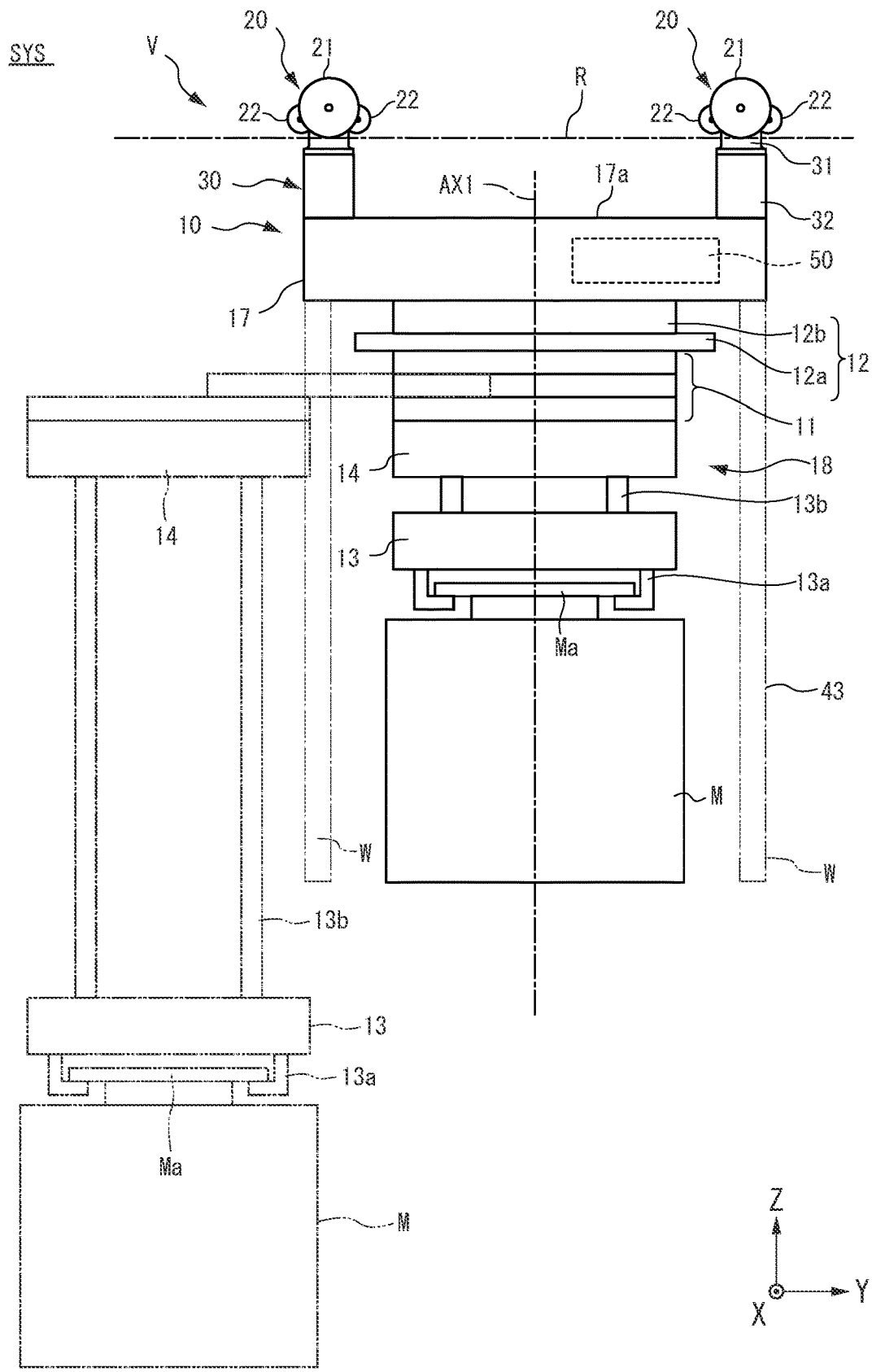
FIG. 3 is a side view showing an example of the traveling vehicle.
Figure 4:
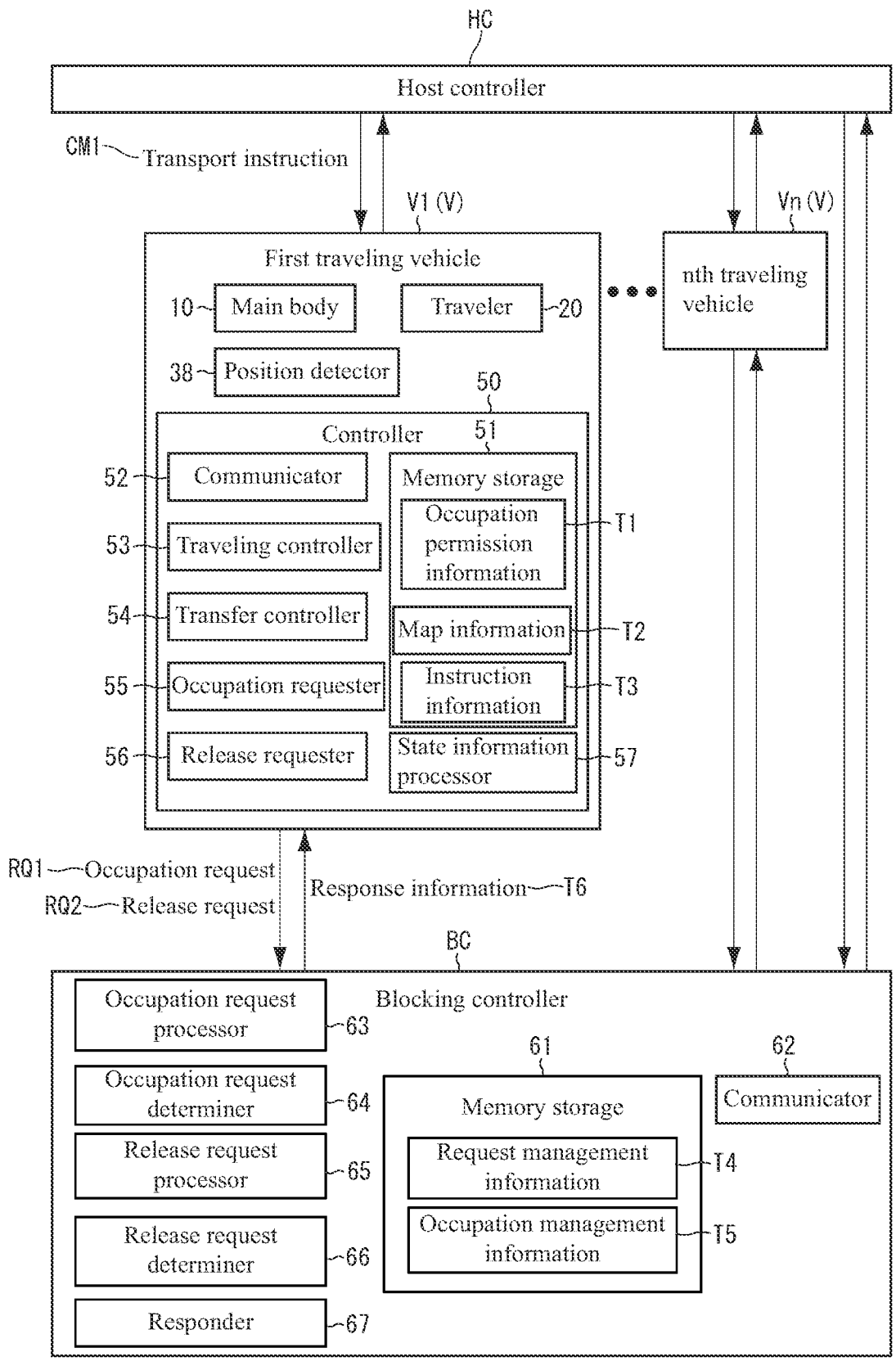
FIG. 4 is a block diagram showing an example of a traveling vehicle, a host controller, and a blocking controller.

FIG. 1 is a perspective view showing a first example of a traveling vehicle system SYS. FIG. 2 is a perspective view of a traveling vehicle V used in the traveling vehicle system SYS shown in FIG. 1. FIG. 3 is a side view showing an example of the traveling vehicle V. FIG. 4 is a block diagram showing an example of the traveling vehicle V, a host controller HC, and a blocking controller BC.

The traveling vehicle system SYS is a system for transporting articles M by traveling vehicles V in a clean room of a semiconductor manufacturing factory, for example. The traveling vehicle system SYS includes a first traveling vehicle V1 to an nth traveling vehicle Vn (hereinafter, may be collectively referred to as traveling vehicles V) (see FIG. 4), and controllers (host controller HC, blocking controller BC) that control the plurality of traveling vehicles V. An example will be described in which the traveling vehicles V are overhead traveling vehicles. The traveling vehicles V move along a track R of the traveling vehicle system SYS. The track R is a traveling region of the traveling vehicles V. The traveling vehicles V move along the track R of the traveling vehicle system SYS and transport articles M such as FOUPs accommodating semiconductor wafers or reticle pods accommodating reticles. The traveling vehicles V articles M, and may hence be referred to as transport vehicles.

The track R is installed on or in the vicinity of the ceiling of a building therein having a clean room or the like. The track R is provided adjacent to a processing apparatus (not shown in the drawings), a stocker (automated warehouse, not shown in the drawings), a buffer (not shown in the drawings) and so forth. The above processing apparatus is, for example, an exposure apparatus, a coater/developer, a film forming apparatus, or an etching apparatus, and performs various processes on semiconductor wafers in containers transported by the traveling vehicles V. The stocker mentioned above stores articles M transported by the traveling vehicles V. The buffer mentioned above temporarily stores articles M transported by the traveling vehicles V.

The track R is an example of the form of a track. The track R is a grid-patterned track having a plurality of first tracks R1, a plurality of second tracks R2, and a plurality of intersections R3. Hereinafter, the track R will be referred to as grid-patterned track R. The plurality of first tracks R1 each extend along the X direction (first direction DR1). The plurality of second tracks R2 each extend along the Y direction (second direction DR2). The grid-patterned track R is formed in a grid pattern as seen in a plan view, with the plurality of first tracks R1 and the plurality of second tracks R2. The grid-patterned track R forms a plurality of cells with the plurality of first tracks R1 and the plurality of second tracks R2. In the example, the first direction DR1 and the second direction DR2 are orthogonal to each other, and the plurality of first tracks R1 and the plurality of second tracks R2 are provided along the directions orthogonal to each other but not intersecting directly with each other. The intersection R3 is arranged at a portion where the first track R1 and the second track R2 intersect with each other. The intersection R3 is adjacent to the first track R1 in the first direction DR1, and is adjacent to the second track R2 in the second direction DR2. The intersection R3 is a connection track that connects the first track R1 and the second track R2, connects the first tracks R1 to each other, and connects the second tracks R2 to each other. The intersection R3 is a track that is used in any of the cases where the traveling vehicle V travels along the first tracks R1, where the traveling vehicle V travels along the second tracks R2, and where the traveling vehicle V travels from the first track R1 to the second track R2 or from the second track R2 to the first track R1. In the grid-patterned track R, the plurality of first tracks R1 and the plurality of second tracks R2 orthogonally intersect with each other, thereby establishing a state where a plurality of grid cells C (cells) are adjacent to each other as seen in a plan view. One grid cell C corresponds to one cell, and is a portion surrounded, as seen in a plan view, by two first tracks R1 adjacent to each other in the second direction DR2 and by two second tracks R2 adjacent to each other in the first direction DR1. FIG. 1 shows a part of the grid-patterned track R, and the grid-patterned track R is formed such that a configuration similar to that illustrated in the figure continues in the first direction DR1 (X direction) and in the second direction DR2 (Y direction).

The first tracks R1, the second tracks R2, and the intersections R3 are suspended from the ceiling not shown in the drawings by suspenders H (see FIG. 1). Each suspender H has first portions H1 to suspend the first track R1, second portions H2 to suspend the second track R2, and a third portion H3 to suspend the intersection R3. The first portion H1 and the second portion H2 are each provided at two opposing locations with the third portion H3 therebetween.

The first track R1, the second track R2, and the intersection R3 each have traveling surfaces R1a, R2a, and R3a on which traveling wheels 21 described later of the traveling vehicle V travel. A clearance D is formed between the first track R1 and the intersection R3, and between the second track R2 and the intersection R3, respectively. The clearance D is a portion through which a coupler 30 (described later) serving as a part of the traveling vehicle V passes when the traveling vehicle V having traveled on the first track R1 crosses the second track R2 or when the traveling vehicle V having traveled on the second track R2 crosses the first track R1. Therefore, the clearance D is provided with a width that allows the coupler 30 to pass therethrough. The first tracks R1, the second tracks R2, and the intersections R3 are provided along the same or substantially the same horizontal plane. In this example, the first tracks R1, the second tracks R2, and the intersections R3 are such that the traveling surfaces R1a, R2a, and R3a thereof are arranged on the same or substantially the same horizontal plane.

The traveling vehicle system SYS includes a communication system (not shown in the drawings). The communication system is used for communication of the traveling vehicles V, the host controller HC, and the blocking controller BC. The traveling vehicles V, the host controller HC, and the blocking controller BC are all communicably connected via the communication system.

In a traveling region of the traveling vehicles V, a plurality of blocking sections B are designated (see FIG. 1), each of which undergoes, when occupied by one of the plurality of traveling vehicles V, exclusive control to prohibit another traveling vehicle V from moving thereinto. In this example, the blocking section B is set for each grid cell C. The traveling vehicle is controlled so as to be able to occupy and pass through the blocking sections B when occupation permissions for the blocking sections B are granted by the blocking controller BC and so as to be prohibited to move into the blocking sections B when the occupation permissions are not granted by the blocking controller BC. Interference between the traveling vehicles V can be prevented by exclusive control, The exclusive control will be further described later.

A configuration of the transport vehicle V will be described. As shown in FIGS. 2 to 4, the traveling vehicle V has a main body 10, travelers 20, couplers 30, and a controller 50 (FIGS. 3 and 4).

The main body 10 is arranged below the grid-patterned track R (on the −Z side). The main body 10 is formed, for example, in a rectangular shape as seen in a plan view. The main body 10 is formed in a size that fits in a single grid cell C (see FIG. 1) in the grid-patterned track R as seen in a plan view. As a result, a space is ensured for traveling vehicles V traveling respectively on the first track R1 and the second track R2 adjacent to each other to pass one another. The main body 10 includes an upper unit 17 and a transferer 18. The upper unit 17 is suspended from the travelers 20 via the couplers 30. The upper unit 17 is, for example, of a rectangular shape as seen in a plan view, and has four corners on the upper surfaces 17a.

The main body 10 has a traveling wheel 21, a coupler 30, and a direction changer 34 at each of the four corners. In this configuration, the traveling wheels 21 arranged at the four corners of the main body 10 enable stable suspension of the main body 10 and stable traveling of the main body 10.

The transferer 18 is provided below the upper unit 17. The transferer 18 can rotate around the rotation axis AX1 along the Z direction (vertical direction). The transferer 18 has an article holder 13 holds an article M, a lift driver 14 that raises or lowers the article holder 13, a lateral extender 11 that causes the lift driver 14 to slide and move in a horizontal direction, and a rotator 12 that holds the lateral extender 11. The article holder 13 grasps the flange Ma of an article M to thereby suspend and hold the article M. The article holder 13 is, for example, a chuck having claws 13a movable in the horizontal direction, and inserts the claws 13a under the flange Ma of the article M and raises the article holder 13, to thereby hold the article M. The article holder 13 is connected to suspenders 13b such as wires and belts.

The lift driver 14 is, for example, a hoist, and lowers the article holder 13 by feeding out suspenders 13b, or raises the article holder 13 by taking up the suspenders 13b. The lift driver 14 is controlled by the controller 50 to raise or lower the article holder 13 at a predetermined speed. Also, the lift driver 14 is controlled by the controller 50 to maintain the article holder 13 at a target height.

The lateral extender 11 has a plurality of movable plates arranged stacked, for example, in the Z direction. The movable plates can move relatively in the Y direction. The lift driver 14 is mounted on the lowermost movable plate. The lateral extender 11 can laterally extend (slide and move) the lift driver 14 and the article holder 13 attached to the lowermost movable plate, for example, in the horizontal direction orthogonal to the traveling direction of the traveling vehicle V, by moving the movable plates by a driver not shown in the drawings.

The rotator 12 is provided between the lateral extender 11 and the upper unit 17. The rotator 12 has a rotation member 12a and a rotation driver 12b. The rotation member 12a is provided to be rotatable in an axial direction around the vertical direction. The rotation member 12a supports the lateral extender 11. The rotation driver 12b uses, for example, an electric motor or the like, and causes the rotation member 12a to rotate in the axial direction around the rotation axis AX1. The rotator 12 can, by rotating the rotation member 12a by the driving force from the rotation driver 12b, rotate the lateral extender 11 (lift driver 14 and article holder 13) in the axial direction around the rotation axis AX1. The traveling vehicle V can receive or deliver the article M from or to a predetermined position, using the transferer 18.

As shown in FIGS. 2 and 3, a cover W may be provided to surround the transferer 18 and the article M held by the transferer 18. The cover W is of a cylindrical shape having an open-ended bottom, and is also of a shape having a cutout portion through which the movable plates of the lateral extender 11 project. The upper end of the cover W is attached to the rotation member 12a of the rotator 12, and the cover W axially rotates around the rotation axis AX1 as the rotating member 12a rotates.

Each traveler 20 has a traveling wheel 21 and auxiliary wheels 22. The traveling wheel 21 is arranged in each of the four corners on the upper surface 17a of the upper unit 17 (main body 10). Each traveling wheel 21 is attached to an axle provided in the coupler 30. The axle is provided in parallel or substantially parallel along the XY plane. Each traveling wheel 21 is driven to rotate by the driving force of a traveling driver 33, which will be described later. Each traveling wheel 21 rolls on the traveling surfaces R1a, R2a, and R3a of the first track R1, the second track R2, and the intersection R3 of the grid-patterned track R, causing the traveling vehicle V to travel. The configuration is not limited to driving all of the four traveling wheels 21 to rotate by the driving force of the traveling driver 33, and only some of the four traveling wheels 21 may be driven to rotate.

Each traveling wheel 21 is provided to be able to turn in the θZ direction around the turning axis AX2. The traveling wheel 21 is turned in the θZ direction by the direction changer 34 described later and, as a result, the traveling direction of the traveling vehicle V can be changed. The auxiliary wheels 22 are each arranged in front and rear of the traveling wheel 21 in the traveling direction. As with the traveling wheel 21, each auxiliary wheel 22 can rotate around the axis of the axle, which is parallel or substantially parallel along the XY plane. The lower end of the auxiliary wheel 22 is set higher than the lower end of the traveling wheel 21. Therefore, when the traveling wheel 21 is traveling on the traveling surfaces R1a, R2a, and R3a, the auxiliary wheels 22 do not come into contact with the traveling surfaces R1a, R2a, and R3a. When the traveling wheel 21 passes over the clearance D (see FIG. 1), the auxiliary wheels 22 come into contact with the traveling surfaces R1a, R2a, and R3a to prevent the traveling wheel 21 from falling. The configuration is not limited to providing two of the auxiliary wheels 22 for a single traveling wheel 21 and, for example, a single auxiliary wheel 22 may be provided for a single traveling wheel 21, or no auxiliary wheel 22 may be provided.

As shown in FIG. 2, the couplers 30 connect the upper unit 17 of the main body 10 and the travelers 20. The coupler 30 is provided at each of the four corners on the upper surface 17a of the upper unit 17 (main body 10). The main body 10 is suspended by the couplers 30 and is arranged below the grid-patterned track R. The coupler 30 has a support member 31 and a connection member 32. The support member 31 rotatably supports the rotation shaft of the traveling wheel 21 and the rotation shafts of the auxiliary wheels 22. The support member 31 maintains the relative position between the traveling wheel 21 and the auxiliary wheels 22. The support member 31 is formed, for example, in a plate shape with a thickness that allows it to pass through the clearance D (see FIG. 1).

The connection members 32 each extend downward from the support member 31 and is coupled to the upper surface 17a of the upper unit 17 to hold the upper unit 17. The connection member 32 therein includes a transmission for transmitting the driving force of the traveling driver 33 described later to the traveling wheel 21. This transmission may be of a configuration in which a chain or a belt is used, or a configuration in which a gear train is used. The connection member 32 is provided to be able to turn in the θZ direction around the turning axis AX2. The turning of the connection member 32 around the turning axis AX2 can cause the traveling wheel 21 to turn around the turning axis AX2 in the θZ direction via the support member 31.

The traveling driver 33 and the direction changer 34 are provided in the coupler 30 (see FIG. 2). The traveling driver 33 is attached to the connection member 32. The traveling driver 33 is a drive source to drive the traveling wheel 21 and, for example, an electric motor or the like is used therefor. Each of the four traveling wheels 21 is driven by the traveling driver 33 to serve as a driving wheel. The four traveling wheels 21 are controlled by the controller 50 to rotate at the same or substantially the same rotation speed. If any one of the four traveling wheels 21 is not used as a driving wheel, the traveling driver 33 is not attached to the connection member 32 thereof.

The direction changer 34 causes the connection member 32 of the coupler 30 to turn around the turning axis AX2 to thereby cause the traveling wheel 21 to turn around the turning axis AX2 in the θZ direction. It is possible, by turning the traveling wheel 21 in the θZ direction, to switch from a first state where the traveling direction of the traveling vehicle V is the first direction DR1 to a second state where the traveling direction is the second direction DR2, or from the second state where the traveling direction is the second direction DR2 to the first state where the traveling direction is the first direction DR1.

The direction changer 34 has a drive source 35, a pinion gear 36, and a rack 37. The drive source 35 is attached to a side surface of the traveling driver 33 away from the turning axis AX2. As the drive source 35, for example, an electric motor or the like is used. The pinion gear 36 is attached to the lower surface side of the drive source 35, and is driven to rotate in the θZ direction by the driving force generated by the drive source 35. The pinion gear 36 is of a circular shape as seen in a plan view and has a plurality of teeth on the outer circumference thereof along the circumferential direction. The rack 37 is fixed to the upper surface 17a of the upper unit 17. The rack 37 is provided at each of the four corners on the upper surface 17a of the upper unit 17, and is provided having an arc shape (sectorial shape) centered on the turning axis AX2 of the traveling wheel 21. The rack 37 has a plurality of teeth that mesh with the teeth of the pinion gear 36, on the outer circumference thereof along the circumferential direction.

The pinion gear 36 and the rack 37 are arranged in the state where the teeth of the pinion gear 36 and the teeth of the rack 37 are in mesh with each other. As the pinion gear 36 rotates in the θZ direction, the pinion gear 36 moves in the circumferential direction around the turning axis AX2 along the outer circumference of the rack 37. As a result of this movement of the pinion gear 36, the connection member 32 turns, and the traveling driver 33 and the direction changer 34 turn together with the pinion gear 36 in the circumferential direction and around the turning axis AX2.

As a result of the turning of the direction changer 34, the traveling wheel 21 and the auxiliary wheels 22 arranged in each of the four corners on the upper surface 17a all turn in the θZ direction and around the turning axis AX2 within a range of 90 degrees. The driving of the direction changer 34 is controlled by the controller 50. The controller 50 may instruct the four traveling wheels 21 to perform the turning operation at the same timing, or may instruct them to perform the turning operations at different timings. By causing the traveling wheel 21 and the auxiliary wheels 22 to turn, the traveling wheel 21 shifts from the state of being in contact with one of the first track R1 and the second track R2 to the state of being in contact with the other. In other words, the traveling wheel 21 shifts from the state where the direction of the rotation axis of the traveling wheel 21 is one of the first direction DR1 and the second direction DR2 to the state where direction of the rotation axis of the traveling wheel 21 is the other. As a result, it is possible to switch between the first state where the traveling direction of the traveling vehicle V is the first direction DR1 (X direction) and the second state where the traveling direction is the second direction DR2 (Y direction).

The traveling vehicle V includes a position detector 38 that detects position information (see FIG. 4). The position detector 38 detects the current position of the traveling vehicle V by detecting a position marker (not shown in the drawings) indicating position information. The position detector 38 detects the position marker in a non-contact manner. The position marker is installed for each grid cell C of the grid-patterned track R.

The controller 50 comprehensively controls the traveling vehicle V. The controller 50 includes a memory storage 51 that memorizes (stores) various data, a communicator 52, a traveling controller 53, a transfer controller 54, an occupation requester 55, a release requester 56, and a state information processor 57. The controller 50 is a computer. While this system illustrates an example of the controller 50 as being provided in the main body 10 (see FIG. 3), the controller 50 may be provided outside the main body 10.

The communicator 52 communicates with external devices. The communicator 52 is wirelessly connected to a communication system (not shown in the drawings). The communicator 52 communicates with each of the host controller HC and the blocking controller BC via the communication system.

The traveling controller 53 controls the traveling of the traveling vehicle V. The traveling controller 53 controls traveling by controlling the traveling driver 33, the direction changer 34 and so forth. The traveling controller 53 controls, for example, traveling speed, operations related to stopping, and operations related to direction changing. The traveling controller 53 controls the traveling on the basis of a transport instruction CM1 described later.

The traveling controller 53 controls the traveling so that the traveling vehicle V travels in accordance with occupation permissions for blocking sections B granted by the blocking controller BC. The occupation permissions received from the blocking controller BC are stored in the memory storage 51 as occupation permission information T1. The occupation permission information T1 includes information indicating blocking sections B for which occupation permissions are granted. For example, when occupation of blocking sections B43 to B49 is permitted, the occupation permission information T1 is expressed as follows. "Blocking sections B43 to B49: Permitted". The occupation permission information T1 is updated to the latest information on the basis of response information T6 described later. The traveling controller 53 controls the traveling of the traveling vehicle V on the basis of the occupation permission information T1. The traveling controller 53 controls the traveling of the traveling vehicle V so that the traveling vehicle V moves into the blocking sections B for which occupation permissions are granted, and does not to move into blocking sections B for which occupation permissions are not granted. When there are blocking sections B for which occupation permissions are not granted, the traveling controller 53 controls the traveling of the traveling vehicle V so that the traveling vehicle V waits immediately before the blocking sections B and does not to move into the blocking sections B.

The transfer controller 54 controls the transfer operation of the traveling vehicle V on the basis of a transport instruction CM1. The transfer controller 54 controls the transferer 18 and so forth to thereby control the transfer operation of the traveling vehicle V. The transfer controller 54 controls the loading operation for gripping an article M arranged at a predetermined location and the unloading operation for unloading the held article M to a predetermined location.

The state information processor 57 periodically generates and updates state information (not shown in the drawings). The state information is stored in the memory storage 51. The state information processor 57 transmits the state information to the host controller HC and the blocking controller BC via the communicator 52. Examples of the state information include information on the current position of the traveling vehicle V, information indicating the current state of the traveling vehicle V such as normal or abnormal, and information on the state of various instructions (being executed, execution completed, execution failed) such as a transport instruction CM1 executed by the traveling vehicle V.

The occupation requester 55 requests occupation permissions regarding a plurality of blocking sections B that are to be occupied by the traveling vehicle V itself and are designated by instructions such as a transport instruction CM1. The occupation requester 55 will be described later.

The release requester 56 requests the blocking controller BC to release the occupation in the blocking sections B for which occupation permissions have been granted. The release requester 56 will be described later.

Figure 5:
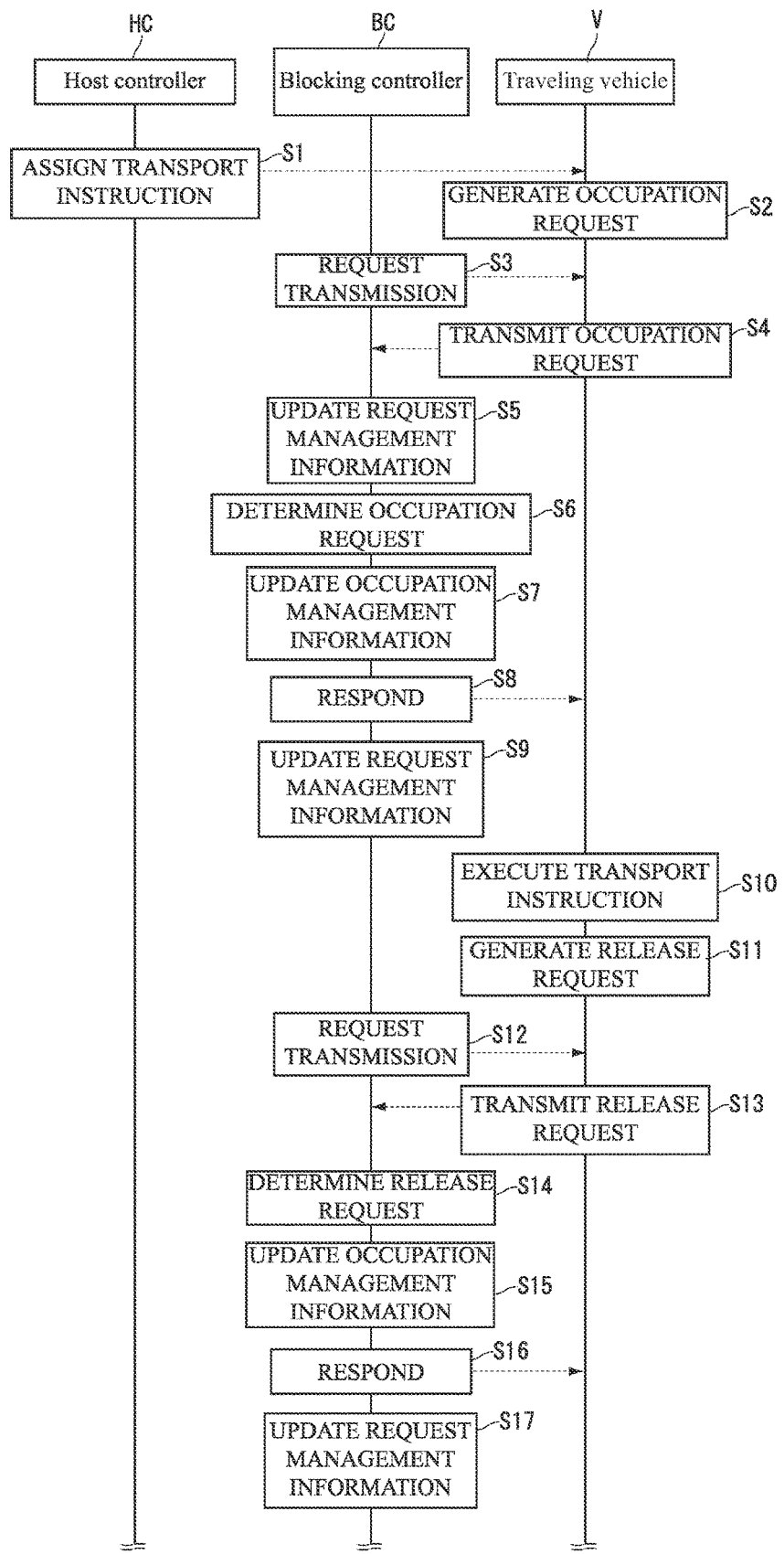
FIG. 5 is a sequence diagram showing an example of an operation of the traveling vehicle system.
Figure 6:
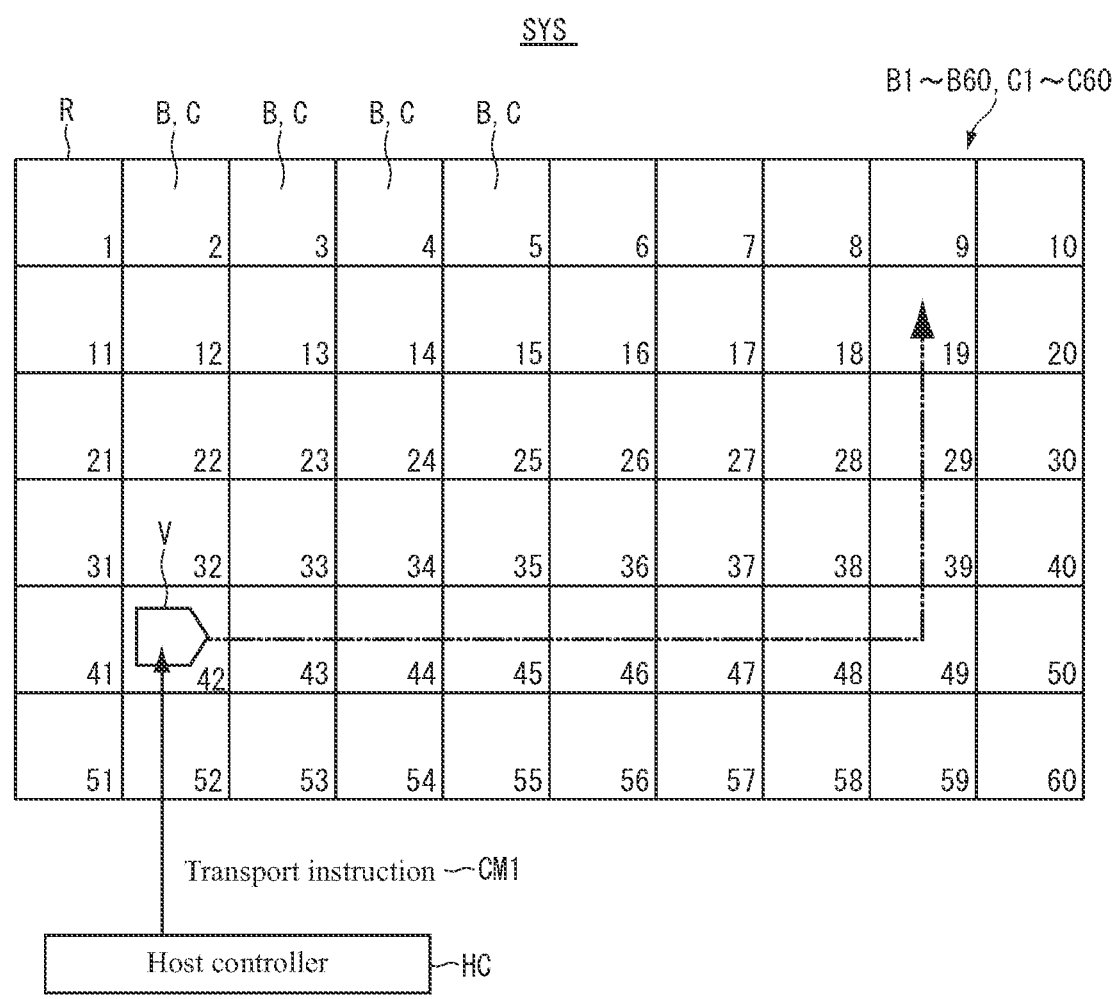
FIG. 6 is a diagram showing an example of an operation of the traveling vehicle system.
Figure 7:
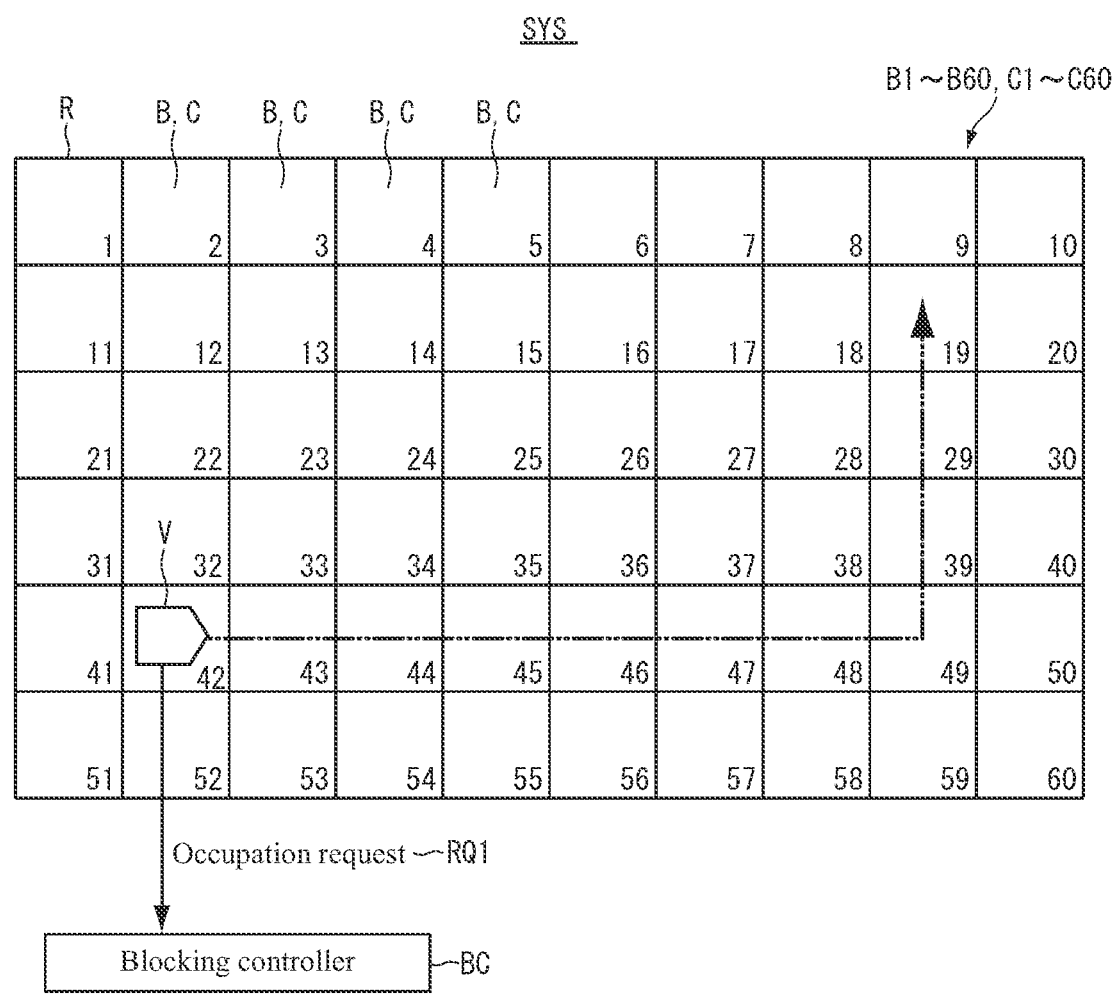
FIG. 7 is a diagram showing an example of an operation of the traveling vehicle system.

Next, control of the traveling vehicles V performed by the host controller HC and the blocking controller BC will be described. FIG. 5 is a sequence diagram showing an example of an operation of the traveling vehicle system SYS. FIGS. 6 and 7 are diagrams showing an example of the operation of the traveling vehicle system SYS. The grid-patterned track R shown in the figures illustrates a part of the entire grid-patterned track R. In the figures such as FIG. 6, grid cells C and blocking sections B of the portions denoted by digits "1 to 60" are grid cells C1 to C60 and blocking sections B1 to B60.

The host controller HC controls assigns a transport instruction CM1 to a transport vehicle V to thereby control the transport (traveling) of the traveling vehicle V (Step S1 of FIG. 5). On the basis of system information, the host controller HC selects a traveling vehicle V capable of transporting an article M, which is a target of the transport instruction CM1, and assigns the transport instruction CM1 to the selected traveling vehicle V. The transport instruction CM1 includes a traveling instruction that causes the traveling vehicle V to execute traveling along a predetermined route, a pickup instruction that causes the traveling vehicle V to pick up an article M arranged at a predetermined location, and an unloading instruction that causes the traveling vehicle V to execute unloading of the held article M to a predetermined location. The system information includes state information of each transport vehicle V, map information showing the location of each part (such as processing apparatus, storage apparatus, or buffer) related to the traveling vehicle system SYS, and position information of the article M. The host controller HC updates the system information by communicating with each of the traveling vehicles V (V1 to Vn) and the blocking controller BC.

For example, as shown in FIG. 6, the host controller HC transmits to the traveling vehicle V an instruction to travel along the traveling route from the grid cell C42 to grid cell C19 indicated by the two-dot chain line as the transport instruction CM1.

Upon receiving the transport instruction CM1, the traveling vehicle V travels along the traveling route designated by the transport instruction CM1. When traveling along the traveling route designated by the transport instruction CM1, the traveling vehicle V needs to pass through a plurality of blocking sections B corresponding to the traveling route, and therefore, treats the plurality of blocking sections B corresponding to the traveling route as the blocking sections B to be occupied by the traveling vehicle V itself. In this example, the traveling vehicle V makes a request to the blocking controller BC, collectively as one set of information through one communication session, for occupation permissions regarding all or some of the plurality of blocking sections B that are to be occupied by the traveling vehicle V itself and are designated by the transport instruction CM1 (see FIGS. 4, 5 and 8). When the traveling vehicle V makes the above request, the occupation requester 55 generates an occupation request RQ1 (occupation permission request) that requests the blocking controller BC for occupation permissions regarding the blocking sections B (Step S2 of FIG. 5). The occupation request RQ1 is information that is sent to the blocking controller BC collectively as one set of information through one communication session so as to request occupation permissions regarding one or more blocking sections B. The controller 50 stores instructions from the host controller HC such as the received transport instruction CM1, in the memory storage 51 as instruction information T3. The occupation requester 55 generates the occupation request RQ1 on the basis of the instruction information T3 (see FIG. 7).

Figure 8:
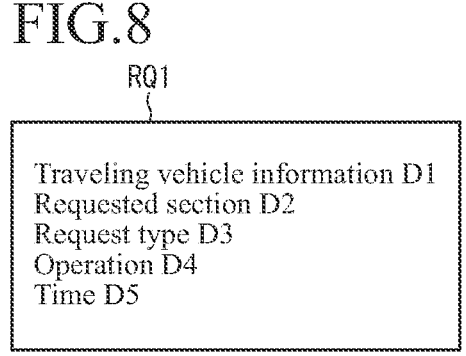
FIG. 8 is a diagram showing an example of an occupation request.

FIG. 8 is a diagram showing an example of the occupation request RQ1. The occupation request RQ1 includes traveling vehicle information D1, requested sections D2, request type D3, operation D4, and time D5. The traveling vehicle information D1 is identification information of the traveling vehicle V. The requested sections D2 is information indicating one or more blocking sections B for which occupation permissions are requested. For example, in indicating a plurality of consecutive blocking sections B, the requested sections D2 is represented by the blocking sections B located at both ends of the sections. For example, the requested sections D2 is represented so as to indicate the blocking section B to be occupied first by the traveling vehicle V and the blocking section B to be occupied last. In such a configuration, the amount of data can be reduced in comparison to the configuration in which a plurality of consecutive blocking sections B is indicated one by one. The request type D3 is information indicating the type of request regarding blocking sections B, and is information indicating that it is an occupation request RQ1. The operation D4 is information indicating the type of operation to be performed at the blocking sections B for which the traveling vehicle V is requesting occupation permissions. For example, the operation D4 is information indicating an operation such as traveling, pickup, unloading, direction changing, and charging. The time D5 is a time at which an occupation request RQ1 is generated. The occupation request RQ1 is not limited to the above example, and may be composed of information other than the information mentioned above.

In the configuration where, as mentioned above, the occupation requester 55 generates an occupation request RQ1 capable of making a request regarding a plurality of blocking sections B to be occupied, collectively as one set of information through one communication session, the number of communication sessions performed between the blocking controller BC and the traveling vehicle V can be reduced in comparison to a configuration that requires an individual transmission (process) of an occupation request for each blocking section.

In this example, as will be described later, the occupation requester 55 generates an occupation request RQ1 that aggregates occupation permissions regarding some of all the blocking sections B to be occupied into one set of information. In such a configuration, the blocking sections occupied by a traveling vehicle V at a time can be reduced in comparison to a configuration in which occupation permissions are requested for all blocking sections B to be occupied by a traveling vehicle V.

Figure 13:
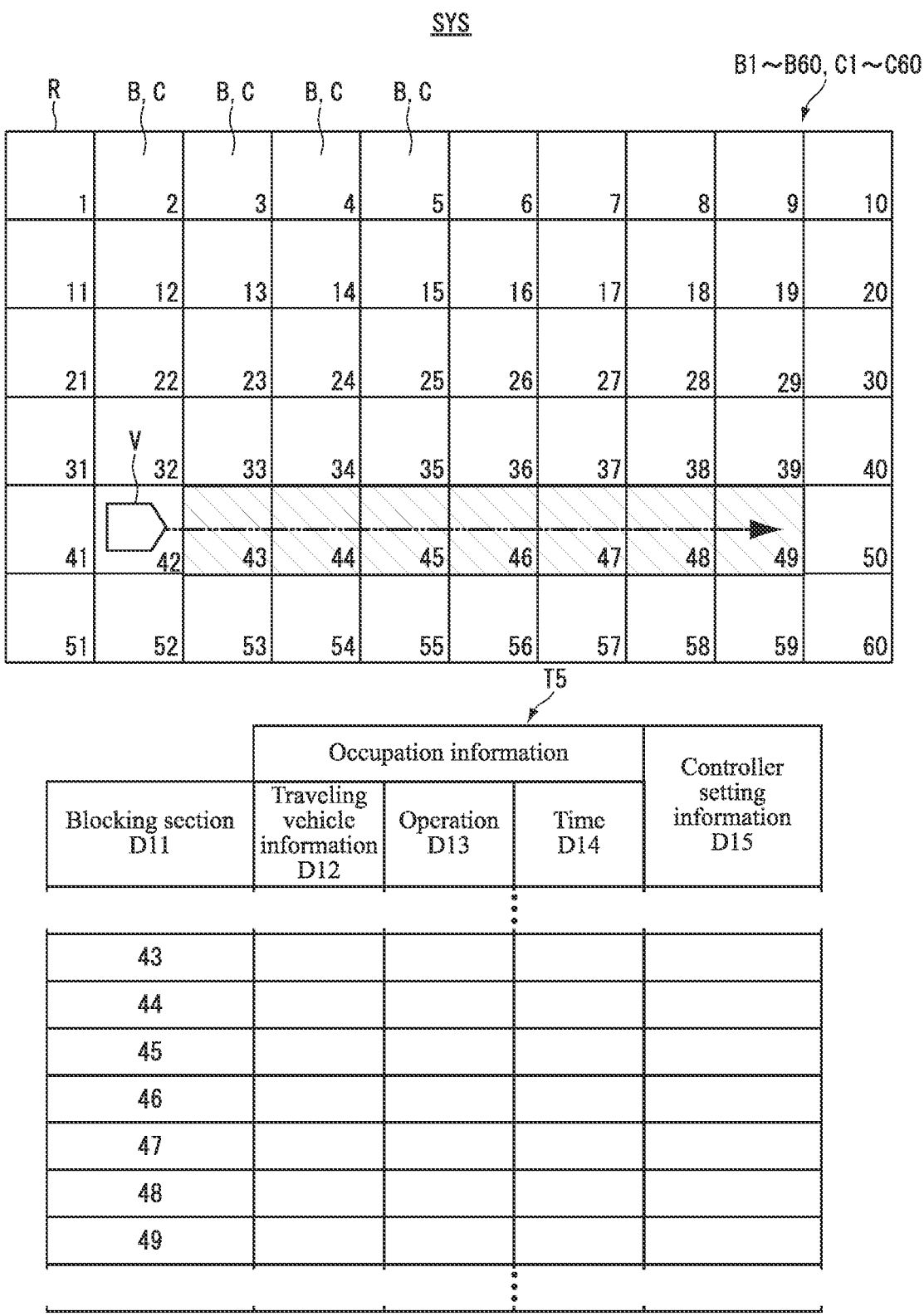
FIG. 13 is a diagram showing an example of a determination performed by an occupation request determiner.

In this example, the occupation requester 55 generates an occupation request RQ1 that aggregates occupation permissions regarding a plurality of blocking sections B consecutive along one of the first direction DR1 and the second direction DR2 into one set of information (see FIG. 13). Compared to the traveling operation of the traveling vehicle V, the operation of changing the direction of the traveling vehicle V is more time consuming. In the above configuration, occupation permissions are not granted to the traveling vehicle V for the blocking sections B in which the traveling vehicle V is to travel after changing the traveling direction thereof, and therefore, it is possible to suppress hindrance to the traveling of the traveling vehicle V associated with exclusive control in the blocking sections B including the traveling route after changing the direction of the traveling vehicle V, in comparison to a configuration in which occupation permissions are granted for the blocking sections B including the traveling route of the traveling vehicle V before and after changing the direction thereof.

The number of the plurality of consecutive blocking sections B mentioned above is determined on the basis of one or both of the speed of the traveling vehicle V and the cycle of communication performed between the traveling vehicle V and the blocking controller BC. In this example, the number of the plurality of consecutive blocking sections B mentioned above is set with the upper limit thereof being the number of blocking sections B in which the traveling vehicle V is allowed to travel during one cycle of communication between the traveling vehicle V and the blocking controller BC. In other words, the above number of the plurality of consecutive blocking sections B for which the traveling vehicle V requests the blocking controller BC for occupation permissions is set so that the traveling vehicle V does not request the blocking controller BC for occupation permissions for the blocking sections B at positions where the traveling vehicle V cannot be traveling during one cycle of communication between the traveling vehicle V and the blocking controller BC. The cycle of communication between the traveling vehicle V and the blocking controller BC is T1 shown in FIG. 16 described later. In the configuration where, as mentioned above, the number of the plurality of consecutive blocking sections B is determined on the basis of one or both of the speed of the traveling vehicle V and the cycle of communication performed between the traveling vehicle V and the blocking controller BC, it is possible to suppress to grant the traveling vehicle V occupation permissions for blocking sections B arranged at positions where the traveling vehicle V cannot be traveling when the speed or the communication cycle of the traveling vehicle V is taken into consideration, and it is possible to suppress hindrance to the traveling of the traveling vehicle V associated with exclusive control in the blocking sections B at positions where the traveling vehicle V cannot be traveling.

An example of generating an occupation request RQ1 by the occupation requester 55 mentioned above is described. For example, when the traveling vehicle V receives a transport instruction CM1 shown in FIG. 6, the blocking sections (B43 to B49 and B39 to B19) need to be occupied after the transport instruction CM1 is received and before the operation on the basis of the transport instruction CM1 is completed. In this example, however, the occupation requester 55 generates an occupation request RQ1 that requests, collectively as one set of information through one communication session, the blocking controller BC for occupation permissions regarding the plurality of blocking sections B43 to B49 that are part of all of the blocking sections B to be occupied (B43 to B49, and B39 to B19), that allow the traveling vehicle V to travel therein during one cycle of the above communication cycle, and that are consecutive along one of the first direction DR1 and the second direction DR2. In such a configuration, the occupation request RQ1 is represented as follows. "Traveling vehicle information D1: V, requested sections D2: B43 to B49, request type D3: occupation permission request, operation D4: traveling, time D5: time of generating occupation request RQ1". The occupation request RQ1 may be set as an occupation request regarding a part but not all of the plurality of blocking sections B consecutive along one of the first direction DR1 and the second direction DR2. For example, in the above example, the occupation request RQ1 may set the requested sections D2 to the blocking sections B43 to Bn (n being an integer not less than 44 and not more than 48).

In the above example, it is necessary to generate an occupation request RQ1 also for the blocking sections B39 to B19. As for the timing of generating such an occupation request RQ1, the occupation request RQ1 for the blocking sections B39 to B19 may be generated when the traveling vehicle V reaches the blocking section B49, or the occupation request RQ1 for the blocking sections B39 to B19 before the traveling vehicle V reaches the blocking section B49 for which the occupation request RQ1 is requested, that is, for example, when the traveling vehicle V has approached a location within a predetermined distance therefrom. This timing is detected, for example, on the basis of the position information of the traveling vehicle V itself and map information T2 stored in the memory storage 51. The map information T2 is information indicating the location of each part (such as processing apparatus, storage apparatus, or buffer) related to the traveling vehicle system SYS.

The plurality of blocking sections B for which the traveling vehicle V requests occupation permissions through the one communication session mentioned above are not limited to the example described above. For example, the occupation requester 55 may generate an occupation request RQ1 regarding all of the blocking sections B that are to be occupied by the traveling vehicle V itself and are designated by the above transport instruction. The occupation requester 55 may not generate an occupation request RQ1 regarding the plurality of blocking sections B consecutive along the one direction mentioned above. The number of the plurality of consecutive blocking sections B for which the traveling vehicle V requests occupation permissions through the one communication session mentioned above may not be determined on the basis of one or both of the speed and the communication cycle of the traveling vehicle V.

The occupation request RQ1 generated by the occupation requester 55 is transmitted to the blocking controller BC by the communicator 52 through one communication session of Step S4 of FIG. 5. The occupation request RQ1 is transmitted to the blocking controller BC through cyclic communication. In Step S4, the transmission is made as a response to the transmission request (Step S3) from the blocking controller BC. The cyclic communication will be described later.

When the blocking controller BC grants the occupation permissions for the blocking sections B, the traveling vehicle V executes the operation in accordance with the transport instruction CM1 (Step S10 of FIG. 5). After having completed the operation in the blocking sections B for which occupation permissions are granted, the traveling vehicle V requests the blocking controller BC to release the occupation permissions granted for the blocking sections B. The completion of the above operation is, for example, a departure from the blocking sections B. A departure from the blocking sections B can be detected in the traveling vehicle V on the basis of the map information T2 and the current position information. The completion of the above operation is detected for each blocking section B in which the operation has been completed, among the plurality of blocking sections B for which occupation permissions are granted. A request for releasing the occupation permissions is made by the release requester 56 generating a release request RQ2 that requests the releasing of the occupation permissions (Step S11) and by transmitting the release request RQ2 to the blocking controller BC (Step S13). The release request RQ2 is information that is sent to the blocking controller BC collectively as one set of information through one communication session so as to request release of the occupation permissions regarding one or more blocking sections B for which the occupation permissions are granted. Upon detecting blocking sections B in which the operation is completed, the release requester 56 generates a release request RQ2 for requesting the releasing of the occupation permissions for the blocking section B. The release requester 56 performs a detection of operation completion for every single blocking section B, and generates a release request RQ2 regarding the blocking section B in which the operation is completed. The release requester 56 generates a release request RQ2 regarding the blocking section B in which the operation is completed, at every communication cycle. The release request RQ2 is represented by, for example, replacing "occupation permission request" of the request type D3 in the above occupation permission RQ1 with "release request".

Figure 9:
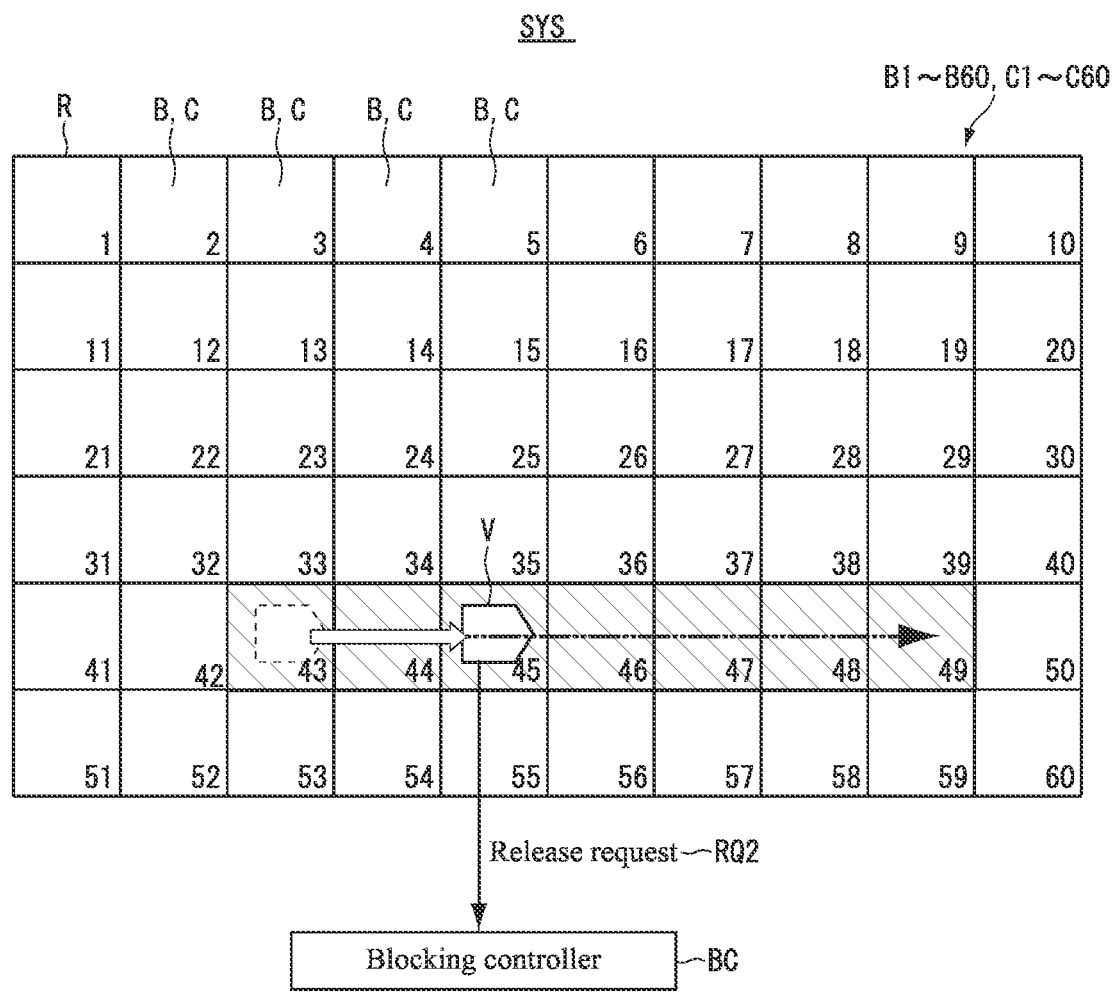
FIG. 9 is a diagram showing an example of an operation related to a release request in the traveling vehicle system.

FIG. 9 is a diagram showing an example of an operation related to a release request RQ2 in the traveling vehicle system SYS. FIG. 9 shows a state where, after occupation permissions for the blocking sections B43 to B49 were granted to the traveling vehicle V, the traveling vehicle V has traveled to the blocking section B45 in one direction (the direction in which the blocking sections B43 to B49 are arranged) where the blocking section B43 is taken as the starting point of traveling.

In the example shown in FIG. 9, the release requester 56 generates a release request RQ2 that requests the releasing of occupation permissions for the blocking sections B43 to B44, in which the operation is completed, in the blocking sections B43 to B49 for which occupation permissions have been granted. At this time, the release requester 56 detects the blocking section B43 in which the operation is completed, and generates the release request RQ2 that requests to release the occupation permission for the blocking section B43. Subsequently, the release requester 56 detects the blocking section B44, in which the operation is completed, and generates the release request RQ2 that has been aggregated into one set of information regarding the blocking sections B43 to B44, for which release of the occupation permissions are requested. The release request RQ2 is represented as follows. "Traveling vehicle information D1: V, requested sections D2: B43 to B44, request type D3: occupation release request, operation D4: traveling, time D5: time generating release request RQ2". As described above, in a configuration where the traveling vehicle V sends a request to the blocking controller BC, collectively as one set of information through one communication session, release of the occupation permissions regarding one or more blocking sections B for which the occupation permissions are granted, the number of communication sessions performed between the blocking controller BC and the traveling vehicle V can be reduced in comparison to a configuration that requires an individual transmission of a release request for each blocking section B. Also, in a configuration where a detection of operation completion is performed for every single blocking section B as mentioned above, and a release request RQ2 is generated for the blocking section B in which the operation is completed, the occupation permission for the blocking section B is promptly released, and therefore, another traveling vehicle V can quickly obtain an occupation permission for the blocking section B.

The release request RQ2 generated by the release requester 56 is transmitted by the communicator 52 to the blocking controller BC through one communication session in Step S13 of FIG. 5. The release request RQ2 is transmitted, by cyclic communication described later, to the blocking controller BC as a response to the transmission request from the blocking controller BC (Step S12). When an occupation request RQ1 and a release request RQ2 to be transmitted to the blocking controller BC are both present, the occupation request RQ1 and the release request RQ2 may be aggregated into one set of information and transmitted through one communication session.

Next, the blocking controller BC is described. The blocking controller BC determines whether or not to grant occupation permissions for one or more blocking sections B for which occupation permissions are requested by the traveling vehicle V, and grants the traveling vehicle V the occupation permissions for the one or more blocking sections B that are determined to be able to allow the permissions.

The blocking controller BC includes a memory storage 61 that memorizes (stores) various data, a communicator 62, an occupation request processor 63, an occupation request determiner 64, a release request processor 65, a release request determiner 66, and a responder 67 (see FIG. 4). The blocking controller BC is a computer. The memory storage 61 memorizes (stores), for example, request management information T4 and occupation management information T5.

The communicator 62 communicates with external devices. The communicator 62 is wirelessly connected to a communication system. The communicator 62 communicates with the plurality of traveling vehicles V and the host controller HC via the communication system.

The occupation request processor 63 performs processing related to an occupation request RQ1. Every time an occupation request RQ1 is received from the traveling vehicle V, the occupation request processor 63 records (adds) the occupation request RQ1 in the request management information T4. Every time a determination is made for an occupation request RQ1, the occupation request processor 63 records (adds) the determination result in the request management information T4.

The release request processor 65 performs processing related to a release request RQ2. Every time a release request RQ2 is received, the release request processor 65 records (adds) the release request RQ2 in the request management information T4. Every time a determination is made for a release request RQ2, the release request processor 65 records (adds) the determination result in the request management information T4.

FIG. 10 is a diagram showing an example of the request management information T4. The request management information T4 is information for managing occupation requests RQ1 and release requests RQ2. The request management information T4 is table data in which received occupation requests RQ1 or release requests RQ2 are associated with information regarding the determination (response) for the occupation requests RQ1 or release requests RQ2. The request management information T4 includes, for example, traveling vehicle information D1, requested sections D2, request type D3, operation D4, time D5, sections D6, response type D7, operation D8, and time D9. The traveling vehicle information D1, the requested sections D2, the request type D3, the operation D4, and the time D5 are information all related to occupation requests RQ1 or release requests RQ2, and are similar to those in FIG. 8.

The sections D6, the response type D7, the operation D8, and the time D9 are information all related to the contents of determination (response) for occupation requests RQ1 or release requests RQ2. For example, the sections D6, the response type D7, and the operation D8 are information indicating the result of the blocking controller BC granting or not granting permissions for the sections D2, the request type D3, and the operation D4, respectively. The time D9 is information indicating the time at which the blocking controller BC grants an occupation permission or a release permission. The request management information T4 is not limited to the above example, and may be composed of information other than the information mentioned above.

Figure 11:
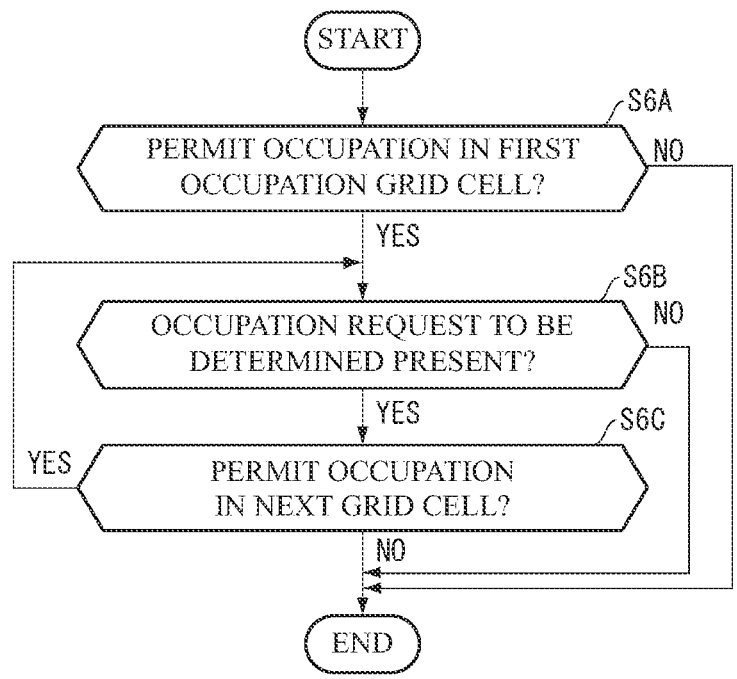
FIG. 11 is a flowchart showing an example of an occupation request determination.

The determination of an occupation request RQ1 is described. FIG. 11 is a flowchart showing an example of an occupation request determination.

The occupation request determiner 64 determines whether or not to permit an occupation request RQ1 (Step S6 of FIG. 5). In accordance with a predetermined criterion that is set in advance, the occupation request determiner 64 determines, among the plurality of blocking sections B for which the traveling vehicle V makes a request for occupation permissions by an occupation request RQ1, one or more of the blocking sections B that are able to allow permissions consecutive from an end thereof to be primarily occupied (the side closer to the operation starting point), based on the basis of the traveling direction of the traveling vehicle V (Steps S6A to S6C in FIG. 11). In such a configuration, one or more of the blocking sections B that are permissible are determined so that an occupation permission for the appropriate blocking section B can be promptly granted to the traveling vehicle V in comparison to a configuration in which no occupation permission will be granted unless permissions for all sections of a plurality of blocking sections B requested to the blocking controller BC are granted.

In Step S6A of FIG. 11, the occupation request determiner 64 determines whether or not to permit regarding the occupation request RQ1 for the blocking section B that the traveling vehicle V occupies first. For example, when the traveling vehicle V makes an occupation request RQ1 regarding the blocking sections B43 to B49 as in the example of FIG. 7, the occupation request determiner 64 determines whether or not to permit regarding the occupation request RQ1 for the blocking section B43 to be occupied first.

If, as a predetermined criterion that is set in advance, an occupation permission is granted to another traveling vehicle V for the determination target blocking section B in Step S6B, the occupation request determiner 64 determines not to grant an occupation permission for that blocking section B (Step S6A: NO).

If, as a predetermined criterion that is set in advance, an occupation permission is not granted to another traveling vehicle V for the determination target blocking section B in Step S6A, the occupation request determiner 64 determines to grant an occupation permission for that blocking section B (Step S6A: YES). The occupation request processor 63 makes the determination of Step S6A on the basis of the occupation management information T5 regarding the determination target blocking section B.

In Step S6A, if requests for occupation permissions for the blocking sections B are received from a plurality of traveling vehicles V, the occupation request determiner 64 determines to grant occupation permissions for the blocking sections B to the traveling vehicle V that requested the occupation permissions first (Step S6A: YES), and the occupation request determiner 64 determines not to grant occupation permissions for the blocking sections B to the traveling vehicle V that requested the occupation permissions later (Step S6A: NO). With this configuration, it is possible to prevent the traveling of the traveling vehicle V that requests an occupation permission first from being hindered by a traveling vehicle V that requests an occupation permission later.

If the occupation request determiner 64 determines not to grant occupation permissions (Step S6A: NO), it is determined that an occupation permission is not to be granted for the blocking section B to be occupied after the blocking section B determined not to grant an occupation permission therefor, that is, one or more blocking sections B on the operation ending point side including the blocking section B, and then the determination ends.

Figure 12:
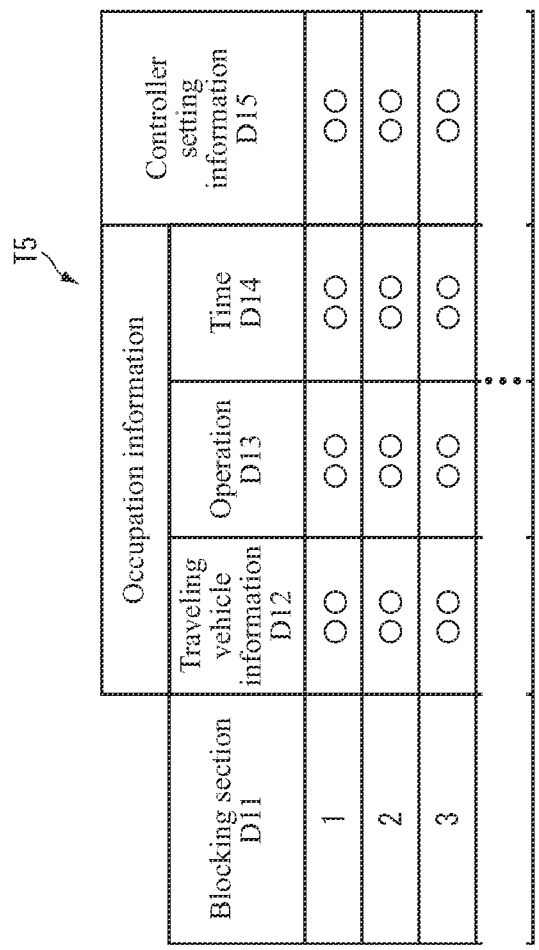
FIG. 12 is a diagram showing an example of occupation management information.

FIG. 12 is a diagram showing an example of occupation management information T5. The occupation management information T5 is information for managing the presence or absence of occupation permissions in blocking sections B. The occupation management information T5 is, for example, table data in which all blocking sections B within the traveling vehicle system SYS and the status of the occupation permissions are associated.

The occupation management information T5 is, for example, table data in which blocking sections D11, traveling vehicle information D12, operation D13, time D14, and controller setting D15 are associated. The blocking sections D11 is identification information of blocking sections B. The traveling vehicle information D12 and the operation D13 are identification information about the traveling vehicle V for which occupation permission is granted in the target blocking section B, and information indicating the permitted operation, respectively. The time D14 is information indicating the time at which the blocking controller BC grants an occupation permission. The traveling vehicle information D12, the operation D13, and the time D14 are represented as empty data (NULL) when, for example, there is no traveling vehicles V for which occupation permission is granted in the target blocking section B. The controller setting D15 indicates information related to the setting of blocking controller BC. For example, when a blocking section B is set as being unusable, the controller setting D15 indicates information to that effect. If an occupation permission is requested regarding the blocking section B that has been set as being unusable in the controller setting D15, the occupation request determiner 64 determines not to grant an occupation permission therefor. The occupation management information T5 is not limited to the above example, and may be composed of, for example, information other than the information mentioned above.

If the occupation request determiner 64 determines that an occupation permission is to be granted (Step S6A: YES), the occupation request determiner 64 determines whether or not there is an occupation request RQ1 to be determined (Step S6B).

If the occupation request determiner 64 determines that there is no occupation request RQ1 to be determined (Step S6B: NO), the determination ends. If the occupation request determiner 64 determines that there is an occupation request RQ1 to be determined (Step S6B: YES), then, in Step S6C, it is determined whether or not to grant an occupation permission regarding a blocking section B to be occupied after the blocking section B for which an occupation permission has been granted.

In Step S6C, the occupation request determiner 64 performs determination similar to that of Step S6A. If an occupation permission is granted to another traveling vehicle V for the determination target blocking section B, the occupation request determiner 64 determines not to grant an occupation permission for that blocking section B (Step S6A: NO). Furthermore, the occupation request determiner 64 determines not to grant an occupation permission regarding the blocking section B to be occupied after the blocking section B that is determined not to grant an occupation permission therefor, and the determination ends.

If an occupation permission is not granted to another traveling vehicle V for the determination target blocking section B in Step S6C, the occupation request determiner 64 determines to grant an occupation permission for that blocking section B (Step S6C: YES). If the occupation request determiner 64 determines to grant the occupation permission (Step S6C: YES), the process returns to Step S6B and the above processing is repeated.

Through Step S6A to Step S6C described above, among the plurality of blocking sections B for which occupation permissions have been requested by the traveling vehicle V, one or more of the blocking sections B are determined which are able to allow permissions starting from an end thereof that is to be primarily occupied based on the traveling direction of the traveling vehicle V, are determined.

Figure 14:
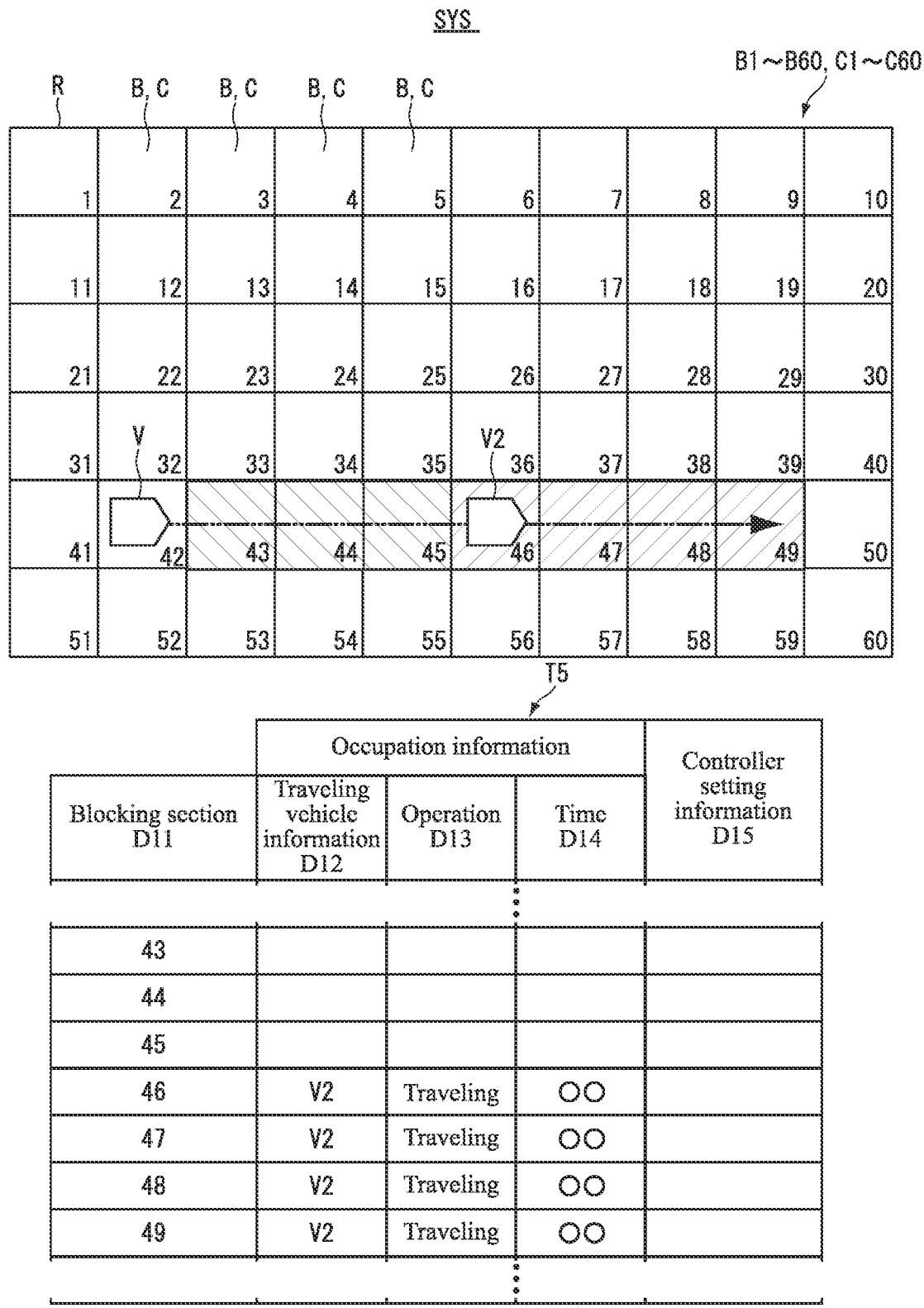
FIG. 14 is a diagram showing an example of a determination performed by the occupation request determiner.

FIGS. 13 and 14 are diagrams showing an example of a determination performed by the occupation request determiner 64. FIG. 13 shows an example of a state where the traveling vehicle V requests occupation permissions for the blocking sections B43 to B49, and no occupation permission is granted to another traveling vehicle V in the blocking sections B43 to B49. In the example shown in FIG. 13, in the occupation management information T5, the blocking sections B43 to B49 are NULL (empty data), indicating that occupation permissions are not granted. In such a configuration, in Step S6A to Step S6C, the occupation request determiner 64 determines to grant occupation permissions to the traveling vehicle V for the blocking sections B43 to B49 on the basis of the occupation management information T5.

FIG. 14 shows an example of a state where the traveling vehicle V requests occupation permissions for the blocking sections B43 to B49, and occupation permissions are granted to a traveling vehicle V2 for the blocking sections B46 to B49. In the example shown in FIG. 14, data is recorded in the occupation management information T5, indicating occupation permissions are granted to the traveling vehicle V2 for the blocking sections B46 to B49. On the other hand, the blocking sections B43 to B45 are NULL (empty data) indicating that occupation permissions are not granted. In such a configuration, in Step S6A to Step S6C, the occupation request determiner 64 determines to grant occupation permissions to the traveling vehicle V for the blocking sections B43 to B45, and determines not to grant occupation permissions for the blocking sections B46 to B49.

When the determination in Step S6 of FIG. 5 is completed, in Step S7, the blocking controller BC updates the occupation management information T5 (traveling vehicle information D12, operation D13, time D14) regarding the blocking sections B for which occupation permissions are granted, on the basis of the determination result of Step S6. The occupation request processor 63 updates the occupation management information T5 regarding the blocking sections B for which the occupation permissions are granted, on the basis of the determination result of Step S6.

When the determination in Step S6 of FIG. 5 ends, in Step S8, the responder 67 transmits to the traveling vehicle V that transmitted an occupation request RQ1 or release request RQ2 the determination result of the occupation request RQ1 as response information T6.

Figure 15:
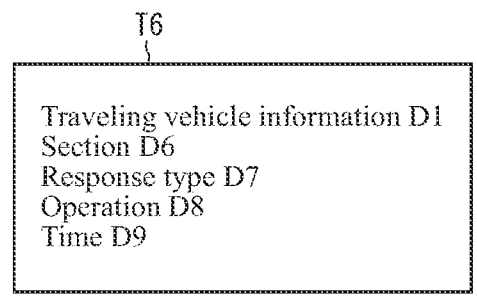
FIG. 15 is a diagram showing an example of response information.

FIG. 15 is a diagram showing an example of the response information T6. The response information T6 includes, for example, traveling vehicle information D1, sections D6, response type D7, operation D8, and time D9. The traveling vehicle information D1, the sections D6, the response type D7, the operation D8 and the time D9 are similar to the traveling vehicle information D1, the section D6, the response type D7, the operation D8 and the time D9 of the request management information T4 shown in FIG. 10.

When the responding in Step S8 of FIG. 5 ends, in Step S9, the blocking controller BC updates the request management information T4 on the basis of the above determination result. The occupation request processor 63 records in (adds to) the request management information T4 the determination result (sections D6, response type D7, operation D8, time D9) for the occupation request RQ1 determined in Step S6.

Upon receiving the response information T6, the controller 50 of the traveling vehicle V updates the occupation permission information T1 stored in the memory storage 51, on the basis of the response information T6. The traveling vehicle V is allowed to move into the blocking sections B, for which occupation permissions are granted. In Step S10, the traveling vehicle V moves into the blocking sections B, for which occupation permissions are granted, and executes an operation on the basis of the transport instruction CM1.

After having completed the operation in the blocking sections B for which occupation permissions are granted, the traveling vehicle V generates a release request RQ2 that requests to release the occupation permissions that have been granted for the blocking sections B (Step S11 of FIG. 5). The generation of the release request RQ2 performed by the traveling vehicle V is as described above.

As a response to the transmission request from the blocking controller BC (Step S12 of FIG. 5), the traveling vehicle V transmits a release request RQ2 to the blocking controller BC through cyclic communication described later (Step S13).

When the blocking controller BC receives the release request RQ2 from the traveling vehicle V, the release request determiner 66 determines whether or not to release the occupation permissions for the blocking sections B on the basis of the release request RQ2, according to a predetermined criterion set in advance. (Step S14 of FIG. 5). The release request determiner 66 determines one or more of the blocking sections B the releasing of which can be permitted from an end thereof to be released first, on the basis of the traveling direction of the traveling vehicle V.

In the example where it is confirmed, on the basis of the state information of the traveling vehicle V, that the traveling vehicle has completed its operation in the blocking sections B, for which occupation permissions are granted, the release request determiner 66 determines to release the occupation permissions regarding the blocking sections B and grants a release permission. If the above confirmation cannot be made, the release request determiner 66 determines not to release the occupation permissions regarding the blocking sections B.

Based on the determination result of Step S14, the release request processor 65 updates the occupation management information T5 regarding the blocking sections B for which the release permission is granted (Step S15). The release request processor 65 updates the occupation management information T5 regarding the blocking sections B, for which the occupation permissions are released, to NULL (empty data) indicating that occupation permissions are not granted.

The release request processor 65 records (adds) the determination result (sections D6, response type D7, operation D8, time D9) for the release request RQ2 determined in Step S14 to the request management information T4 and updates it (Step S16).

When the determination in Step S14 of FIG. 5 ends, in Step S17, the responder 67 transmits to the traveling vehicle V that transmitted the release request RQ2 the determination result of the release request RQ2 as response information T6.

The traveling vehicle system SYS of this example controls the traveling vehicles V by repeating the operations of Step S1 to Step S17 of FIG. 5 for each traveling vehicle V in the system. The order of executing processes shown in Step S1 to Step S17 described above is merely an example, and can be realized in an arbitrary order unless an output of the previous processing is used in the following processing. Furthermore, some of the processes of Step S1 to Step S17 may be performed in parallel.

Figure 16:
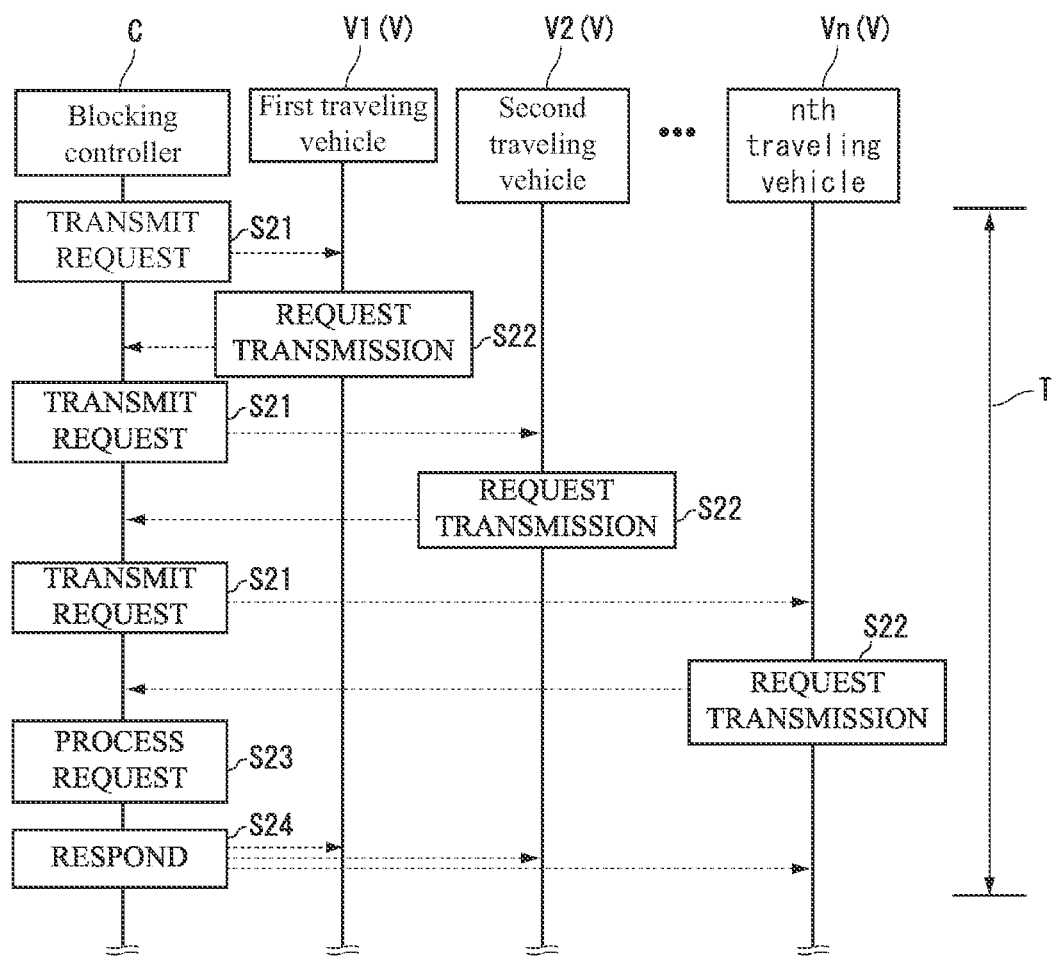
FIG. 16 is a diagram showing an example of an operation of the blocking controller.

FIG. 16 is a diagram showing an example of the operation of the blocking controller BC. The blocking controller BC performs the above processing (Step S3, Step S5 to Step S9, Step S14 to Step S17), using cyclic communication. The cyclic communication is, for example, polling communication.

In Step S21, the blocking controller BC transmits to the first traveling vehicle V1 a transmission request requesting a transmission of an occupation request RQ1 and a release request RQ2 to the blocking controller BC.

In Step S22, once the transmission request is received, the first traveling vehicle V1 transmits, as a response to the transmission request, the occupation request RQ1 and the release request RQ2 to the blocking controller BC. Step S22 is similar to Step S4 and Step S12 of FIG. 5.

Upon receiving the occupation request RQ1 and the release request RQ2 from the first traveling vehicle V1, in Step S21, the blocking controller BC transmits to the next second traveling vehicle V2 a transmission request requesting a transmission of the occupation request RQ1 and the release request RQ2 to the blocking controller BC.

The traveling vehicle system SYS repeats Step S21 and Step S22, and executes them sequentially for the first traveling vehicle V1 to the nth traveling vehicle Vn. Through this processing, the occupation request RQ1 and the release request RQ2 are transmitted to the blocking controller BC from each of the first traveling vehicle V1 to the nth traveling vehicle Vn.

Upon receiving the occupation request RQ1 and the release request RQ2 from each of the first traveling vehicle V1 to the nth traveling vehicle Vn, the blocking controller BC performs the processes of Step S5 to Step S7 and Step S14 to Step S17 of FIG. 5 all together in Step S23. Through this processing, the blocking controller BC performs processes such as determination for the occupation request RQ1 and the release request RQ2 transmitted from each of the first traveling vehicle V1 to the nth traveling vehicle Vn.

In Step S24, the blocking controller BC transmits to each of the first traveling vehicle V1 to the nth traveling vehicle Vn the determination result for the occupation request RQ1 and the release request RQ2 as response information T6. Step S24 is similar to Step S9 and Step S16 of FIG. 5. The first traveling vehicles V1 to the nth traveling vehicle Vn that have received the response information T6 are subjected to exclusive control on the basis of the received response information T6.

The traveling vehicle system SYS performs the exclusive control by cyclically repeating Step S21 to Step S24 where Step S21 to Step S24 are taken as one cycle.

As described above, the traveling vehicle system SYS of this example is a traveling vehicle system including a plurality of traveling vehicles V and a blocking controller BC that is capable of communicating with the plurality of traveling vehicles V and that controls the plurality of traveling vehicles V, a traveling region of the traveling vehicles V having designated therein a plurality of blocking sections B each of which undergoes, when occupied by one of the plurality of traveling vehicles V, exclusive control to prohibit another traveling vehicle V from moving thereinto, and the traveling vehicle V being controlled to be able to occupy and pass through the blocking sections B when occupation permissions for the blocking sections B are granted by the blocking controller BC and to be prohibited to move into the blocking sections B when the occupation permissions are not granted by the blocking controller BC. The traveling vehicle V makes a request to the blocking controller BC, collectively as one set of information through one communication session, for occupation permissions regarding a plurality of the blocking sections B that are to be occupied by the traveling vehicle V and are designated by instructions. In accordance with a predetermined criterion that is set in advance, the blocking controller BC determines, among the plurality of blocking sections B for which the traveling vehicle V makes a request for occupation permissions, one or more of the blocking sections B that are able to allow permissions consecutive from an end thereof to be primarily occupied, based on the traveling direction of the traveling vehicle V, and the blocking controller BC grants the traveling vehicle V the occupation permissions for the one or more blocking sections B that are determined to be able to allow the permissions. According to the above configuration, in the traveling vehicle system SYS that prevents interference between traveling vehicles V by exclusive control, the number of communication sessions performed between the blocking controller BC and the traveling vehicle V can be reduced in comparison to a configuration that requires an individual transmission of an occupation permission request for each blocking section B and, also, an occupation permission for the appropriate blocking section B can be promptly granted to the traveling vehicle V in comparison to a configuration in which no occupation permission will be granted unless permissions for all sections of a plurality of blocking sections B requested to the blocking controller BC are granted. Therefore, it is possible to avoid hindrance to the traveling of a traveling vehicle V associated with exclusive control. In the traveling vehicle system SYS, configurations other than those described above are arbitrary configurations, and configurations other than those described above may or may not be necessary.

The traveling vehicle system SYS of this example includes a grid-patterned track R that has a plurality of first tracks R1 extending along a first direction DR1, and a plurality of second tracks R2 extending along a second direction DR2, which is different from the first direction DR1, and that forms a plurality of cells with the plurality of the first tracks R1 and the plurality of second tracks R2. Moreover, the plurality of traveling vehicles V travel on the first tracks R1 or the second tracks R2 along the grid-patterned track R, and the blocking section B is set for each grid cell C, which is one of the cells in the grid-patterned track R. In such a configuration, a traveling vehicle V in a stop state at any grid cell C hinders the traveling of another traveling vehicle V since all of the grid cells C of a grid-patterned track R are intersections. Therefore, in the grid-patterned track R, hindrance to the traveling of another traveling vehicle V is likely to reduce the traveling efficiency in comparison to a traveling vehicle system configuration having tracks other than the grid-patterned track R. According to the above configuration, however, it is possible to suppress the reduction in the traveling efficiency mentioned above.

Next, a traveling vehicle control method of the example will be described, on the basis of the traveling vehicle system SYS of the example described above. In the following description of the traveling vehicle control method of the example, configurations similar to those in the above traveling vehicle system SYS are given the same reference signs and the descriptions thereof are omitted or simplified where appropriate. Also, among the items described herein, applicable configurations are also applied to the traveling vehicle control method where appropriate. Furthermore, our traveling vehicle control method is not limited by the following description.

The traveling vehicle control method is a traveling vehicle control method in the traveling vehicle system SYS. The traveling vehicle control method includes: making the travelling vehicle V to make a request to the blocking controller BC collectively as one set of information through one communication session, for occupation permissions regarding a plurality of the blocking sections B that are to be occupied by the traveling vehicle V and are designated by instructions; and making the blocking controller BC to determine, in accordance with a predetermined criterion that is set in advance, among the plurality of blocking sections B for which the traveling vehicle V makes a request for occupation permissions, one or more of the blocking sections B that are able to allow permissions consecutive from an end thereof to be primarily occupied, based on the traveling direction of the traveling vehicle V, and to grant the traveling vehicle V the occupation permissions for the one or more blocking sections B that are determined to be able to allow the permissions.

In the traveling vehicle control method, making a request to the blocking controller BC collectively as the above one set of information through one communication session, is performed by executing Step S2 and Step S4 of FIG. 5, for example. In the traveling vehicle control method, granting the traveling vehicle occupation permissions for the one or more blocking sections B that are determined to be able to allow the permissions is performed by, for example, executing Step S5 to Step S9 of FIG. 5.

According to the traveling vehicle control method, in the traveling vehicle system SYS that prevents interference between traveling vehicles V by exclusive control, the number of communication sessions performed between the blocking controller BC and the traveling vehicle V can be reduced in comparison to a configuration that requires an individual transmission of an occupation permission request for each blocking section B and, also, it is possible to avoid hindrance to the traveling of a traveling vehicle V associated with exclusive control in comparison to a configuration in which no occupation permission will be granted unless permissions for all sections of a plurality of blocking sections B requested to the blocking controller BC are granted. In the traveling vehicle control method, configurations other than those described above are arbitrary configurations, and configurations other than those described above may or may not be necessary.

The traveling vehicle system SYS and the control method are a system and a method of realizing prevention of interference between traveling vehicles V by exclusive control, and can, therefore, be implemented without, for example, providing a new mechanical mechanism and a physical sensor such as a sensor for detecting another traveling vehicle V, in the existing traveling vehicle system. Therefore, no failure will occur in mechanical mechanisms or physical sensors, and no adjustment or maintenance is required for mechanical mechanisms or physical sensors.

Second Example

Hereunder, a second example is described. In this example, members similar to those described above are assigned with the same reference signs and the descriptions thereof are omitted or simplified where appropriate. Also, among the items described in the examples herein, configurations applicable to this example are also applied to this example where appropriate.

Figure 17:
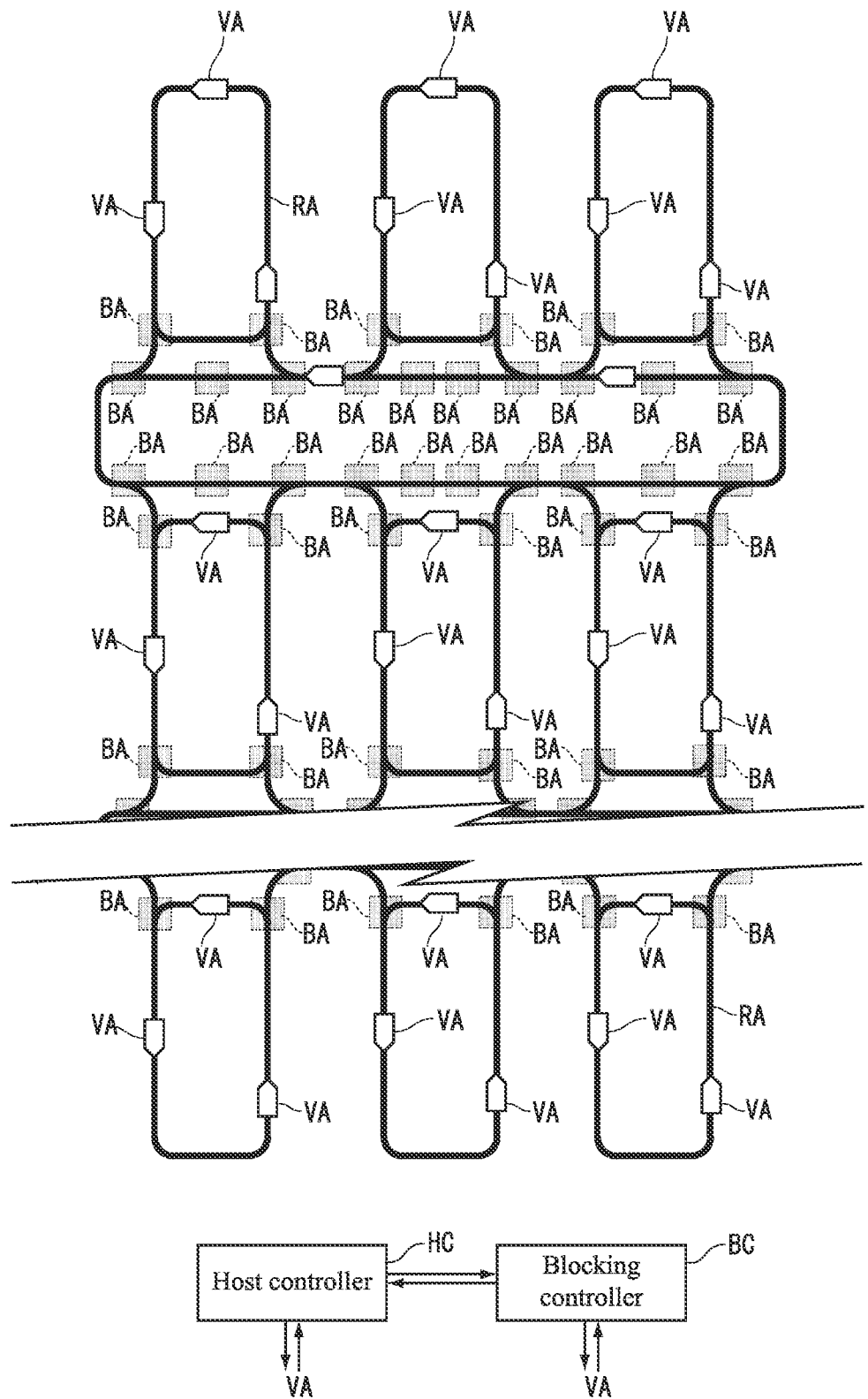
FIG. 17 is a diagram showing a second example of a traveling vehicle system.

FIG. 17 is a diagram showing a traveling vehicle system SYS2 according to the second example.

In the traveling vehicle system SYS2 of the Second example, the track R, the blocking sections B, and the traveling vehicles V may be of other configurations. For example, the traveling vehicle system SYS2 of this example differs from the traveling vehicle system SYS of the first example in the configurations of the grid-patterned track R, the blocking sections B, and the traveling vehicles V, and configurations other than the grid-patterned track R, the blocking sections B, and the traveling vehicles V are similar to those of the traveling vehicle system SYS of the first example.

A track RA of the traveling vehicle system SYS2 is a track in which a plurality of track-shaped (oval-shaped) circulating tracks are connected. The track RA is installed in a state of being suspended from the ceiling of a building. The track RA has a plurality of branching parts and merging parts. A blocking section BA of the traveling vehicle system SYS2 is set at each intersection serving as a branching part or as a merging part of the track RA. The traveling vehicles VA of the traveling vehicle system SYS2, for example, travel along the track RA and travel almost directly below the track RA.

The technical scope of this disclosure is not limited to the mode described in the above examples. One or more of the requirements described in the above examples may sometimes be omitted. One or more of the requirements described in the above examples may be appropriately combined. The contents of Japanese Patent Application No. 2019-095828 and all documents cited herein are incorporated herein by reference.

For example, the configuration of the blocking controller BC described above is merely an example, and another configuration may be employed therefor. For example, the blocking controller BC may have some or all of the configurations of the host controller HC described above.

The predetermined criterion used for the determination performed by the occupation request determiner 64 described above is an example, and another criterion may be employed therefor. For example, the predetermined criterion may include determining to grant occupation permissions for the blocking sections B to the traveling vehicle V of a high priority among the plurality of traveling vehicles V, on the basis of the priorities of the plurality of traveling vehicles V, and determining not to grant occupation permissions to a traveling vehicle V of a low priority, when requests for occupation permissions for the blocking sections B are received from the plurality of traveling vehicles V. In the case of such a configuration, it is possible to prevent the traveling of the traveling vehicle V of a high priority from being hindered by the traveling vehicle V of a low priority. The priority mentioned above is configured so that the occupation request determiner 64 can make reference thereto. The priority mentioned above may be set in advance, or may be set by any of the host controller HC, the blocking controller BC, and the traveling vehicle V, on the basis of a predetermined criterion while the system is operating.

Moreover, when requests for occupation permissions for a blocking section B are received from a plurality of the traveling vehicles V, the predetermined criterion may include determining to grant occupation permission for the blocking section B to the traveling vehicle V having a short route distance to the blocking section B, among the plurality of traveling vehicles V, and determining not to grant occupation permission to a traveling vehicle V having a long route distance to the blocking section B, in terms of the route distances between the target blocking section B of the occupation permission and the traveling vehicles V. In such a configuration, it is possible to prevent the traveling of the traveling vehicle V having a short route distance to the blocking section B from being hindered by the traveling vehicle V having a long route distance to the blocking section B.

The processing of Step S21 to S24 performed by the blocking controller BC is merely an example, and another method may be employed. For example, the blocking controller BC may process the request transmission of the first traveling vehicle V1 to the nth traveling vehicle Vn in Step S22 by the processing of Step S5 to S9 or Step S14 to S17 for every request transmission of the first traveling vehicle V1 to the nth traveling vehicle Vn, rather than processing it collectively by Step S23 and Step S24.

The processing of Step S3 to S9 or Step S14 to S17 performed by the blocking controller BC is merely an example, and another method may be employed. For example, the blocking controller BC may process the request transmission of the first traveling vehicle V1 to the nth traveling vehicle Vn by the processing of Step S5 to S9 or Step S14 to S17 for every request transmission of the first traveling vehicle V1 to the nth traveling vehicle Vn, rather than processing it through cyclic communication described in FIG. 16 and so forth.

The method of controlling a traveling vehicle in the traveling vehicle system described above may be realized by a computer program. For example, the above program includes: a program that causes a computer of the traveling vehicle V to execute the processing of making the traveling vehicle V to make a request to the blocking controller BC, collectively as one set of information through one communication session, for occupation permissions regarding a plurality of the blocking sections B that are to be occupied by the traveling vehicle V and are designated by instructions; and a program that causes a computer of the blocking controller to execute the processing of making the blocking controller BC to determine, in accordance with a predetermined criterion that is set in advance, among the plurality of blocking sections B for which the traveling vehicle V makes a request for occupation permissions, one or more of the blocking sections B that are able to allow permissions consecutive from an end thereof to be primarily occupied, based on the traveling direction of the traveling vehicle V, and to grant the traveling vehicle the occupation permissions for the one or more blocking sections B that are determined to be able to allow the permissions. This program may also be recorded and provided on a computer-readable memory storage medium (for example, non-transitory tangible medium), or may be provided by a control device that executes the program.

The invention claimed is:

1. A traveling vehicle system comprising:
a track;
a plurality of traveling vehicles that move along the track; and
a controller capable of communicating with the plurality of traveling vehicles and controls the plurality of traveling vehicles,
the track including a grid-patterned track that has a plurality of first tracks and a plurality of second tracks, the plurality of first tracks extending along a first direction, the plurality of second tracks extending along a second direction different from the first direction, and the plurality of first tracks and the plurality of the second tracks forming a plurality of grid cells,
a plurality of blocking sections each of which undergoes, when occupied by one of the plurality of traveling vehicles, exclusive control to prohibit another traveling vehicle from moving thereinto being set for the plurality of grid cells, respectively, in the grid-patterned track, and
the traveling vehicle being controlled to be able to occupy and pass through the blocking sections when occupation permissions for the blocking sections are granted by the controller and to be prohibited to move into the blocking sections when the occupation permissions are not granted by the controller,
wherein the traveling vehicle makes a request to the controller, collectively as one set of information through one communication session for occupation permissions regarding a plurality of the blocking sections that are to be occupied by the traveling vehicle and are designated by instructions,
wherein the controller determines, in accordance with a predetermined criterion set in advance, among the plurality of blocking sections for which the traveling vehicle makes a request for occupation permissions, one or more of the blocking sections that are able to allow permissions consecutive from an end thereof to be primarily occupied, based on the traveling direction of the traveling vehicle,
wherein, the controller grants the traveling vehicle the occupation permissions for the one or more blocking sections when the one or more of the blocking sections are determined to be able to allow the permissions, and
wherein, in requesting the occupation permissions, the traveling vehicle requests an occupation request, as one set of information through one communication session, for the blocking sections that correspond to the grid cells that will be passed through by the traveling vehicle before a subsequent change in the traveling direction thereof in the grid-patterned track.

2. The traveling vehicle system according to claim 1, wherein the plurality of blocking sections for which the traveling vehicle requests the controller for the occupation permissions are a part of all blocking sections that are to be occupied by the traveling vehicle and are designated by the instructions.

3. The traveling vehicle system according to claim 1, wherein the number of the plurality of blocking sections for which the traveling vehicle requests the controller for the occupation permissions is determined based on one or both of a speed of the traveling vehicle and a cycle of communication performed between the traveling vehicle and the controller.

4. The traveling vehicle system according to claim 1, wherein, after the traveling vehicle completes an operation in the blocking sections, the controller releases the occupation in the blocking sections.

5. The traveling vehicle system according to claim 1, wherein the predetermined criterion includes granting occupation permissions for the blocking sections to the traveling vehicle that requested the occupation permissions first, when requests for occupation permissions for the blocking sections are received from the plurality of traveling vehicles.

6. The traveling vehicle system according to claim 1, wherein the predetermined criterion includes granting occupation permissions for the blocking sections to the traveling vehicle of a high priority among the plurality of traveling vehicles, on the basis of the priorities of the plurality of traveling vehicles, when occupation permissions for the blocking sections are requested from the plurality of traveling vehicles.

7. A traveling vehicle control method in a traveling vehicle system including a track, a plurality of traveling vehicles that move along the track, and a controller capable of communicating with the plurality of traveling vehicles and that controls the plurality of traveling vehicles, the track including a grid-patterned track that has a plurality of first tracks and a plurality of second tracks, the plurality of first tracks extending along a first direction, the plurality of second tracks extending along a second direction different from the first direction, and the plurality of first tracks and the plurality of the second tracks forming a plurality of grid cells, a plurality of blocking sections each of which undergoes, when occupied by one of the plurality of traveling vehicles, exclusive control to prohibit another traveling vehicle from moving thereinto being set for the plurality of grid cells, respectively, in the grid-patterned track, and the traveling vehicle being controlled to be able to occupy and pass through the blocking sections when occupation permissions for the blocking sections are granted by the controller and to be prohibited to move into the blocking sections when the occupation permissions are not granted by the controller, the method comprising:

causing the travelling vehicle to make a request to the controller, collectively as one set of information through one communication session, for occupation permissions regarding a plurality of the blocking sections that are to be occupied by the traveling vehicle and designated by instructions; and causing the controller to determine, in accordance with a predetermined criterion that is set in advance, among the plurality of blocking sections for which the traveling vehicle makes a request for occupation permissions, one or more of the blocking sections able to allow permissions consecutive from an end thereof to be primarily occupied, based on the traveling direction of the traveling vehicle, and causing the controller to grant the traveling vehicle the occupation permissions for the one or more blocking sections when the one or more of the blocking sections are determined to be able to allow the permissions, wherein, in requesting the occupation permissions, the traveling vehicle requests an occupation request, as one set of information through one communication session, for the blocking sections that correspond to the grid cells that will be passed through by the traveling vehicle before a subsequent change in the traveling direction thereof in the grid-patterned track.

* * * * *